(12) United States Patent
Segawa et al.

(10) Patent No.: US 6,193,142 B1
(45) Date of Patent: Feb. 27, 2001

(54) ASSEMBLING APPARATUS ASSEMBLING BODY SIDE OF AUTOMOTIVE VEHICLE AND ASSEMBLING METHOD THEREOF

(75) Inventors: Teruo Segawa; Kaoru Okuyama; Setsuo Nakamura; Yukihide Ueda; Shoichi Takahashi; Jun Matsubara, all of Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 08/998,018

(22) Filed: Dec. 24, 1997

(30) Foreign Application Priority Data

| Dec. 25, 1996 | (JP) | ................................................. 8-345820 |
| Mar. 12, 1997 | (JP) | ................................................. 9-057911 |
| Mar. 12, 1997 | (JP) | ................................................. 9-057917 |
| Mar. 12, 1997 | (JP) | ................................................. 9-057948 |

(51) Int. Cl.$^7$ ............................. B23K 5/22; B23K 31/02; B23K 37/00; B21D 39/03
(52) U.S. Cl. ........................ 228/212; 228/32; 228/47.1; 228/213; 29/429; 29/200
(58) Field of Search ................ 700/95, 96, 108; 901/18, 42; 414/729, 739; 228/49 R, 212, 102

(56) References Cited

U.S. PATENT DOCUMENTS

| Re. 36,541 | * | 2/2000 | Rossi . | |
| 3,968,558 | * | 7/1976 | Sekine et al. . | |
| 4,256,947 | * | 3/1981 | De Candia . | |
| 4,483,476 | * | 11/1984 | Fujikawa et al. . | |
| 4,586,359 | * | 5/1986 | Parks . | |
| 4,682,722 | * | 7/1987 | Bossotto et al. | .................. 228/41 |
| 4,802,616 | * | 2/1989 | Naruse et al. | .................. 228/4.1 |
| 4,905,884 | * | 3/1990 | Alborante et al. . | |
| 4,972,987 | * | 11/1990 | Di Rosa | .................. 228/4.1 |
| 5,111,988 | * | 5/1992 | Strickland | .................. 228/102 |
| 5,123,161 | * | 6/1992 | Kubo et al. . | |
| 5,191,707 | * | 3/1993 | Sasamoto et al. . | |
| 5,267,683 | * | 12/1993 | Hamada et al. | .................. 228/4.1 |
| 5,374,799 | * | 12/1994 | Nishimoto et al. . | |
| 5,395,205 | * | 3/1995 | Dugas et al. . | |
| 5,400,943 | * | 3/1995 | Rossi | .................. 228/6.1 |
| 5,560,535 | * | 10/1996 | Millet et al. | .................. 228/49.1 |
| 5,902,496 | * | 5/1999 | Alborante | .................. 219/86.24 |
| 6,065,200 | * | 5/2000 | Negre . | |

FOREIGN PATENT DOCUMENTS

| 3319716 | * | 12/1983 | (DE) . |
| 04244332 | * | 9/1992 | (JP) . |
| 7-96397 | | 4/1995 | (JP) . |
| 10328884 | * | 12/1998 | (JP) . |

* cited by examiner

Primary Examiner—Patrick Ryan
Assistant Examiner—Colleen Cooke
(74) Attorney, Agent, or Firm—McDermott, Will & Emery

(57) ABSTRACT

An assembling apparatus assembling a body side of an automotive vehicle, comprises: a moving body provided in a transfer line; a clamp member provided on the moving body for fixing and positioning a body side outer in an upright position in such a manner that a roof rail end of the body side outer is an upper portion and the side sill end of the body side outer is a lower portion; and a welding robot disposed in a side of the transfer line, the welding robot assembling the body side by welding the body side outer positioned by the clamp member.

3 Claims, 27 Drawing Sheets

ASSEMBLING APPARATUS ASSEMBLING BODY SIDE OF AUTOMOTIVE VEHICLE AND ASSEMBLING METHOD THEREOF

BACKGROUND OF THE INVENTION

1. Field of the Invention

The present invention relates to an assembling apparatus for assembling a body side of an automotive vehicle and an assembling method thereof which is used at a time of assembling the body side such as assembling various kinds of inner parts to a body side outer part.

More particularly, the present invention relates to a work-piece positioning apparatus and a work-piece positioning method for moving and positioning a work-piece gripped by a robot hand to a predetermined welding position.

Furthermore, the present invention relates to a spot welding method for performing a spot welding on the work-piece which is transferred to a predetermined welding state position by a conveyor and the like, by means of a welding gun.

2. Description of the Related Art

In a body side of the automotive vehicle, there is a structure which is assembled by a body side outer and a various kinds of inner parts. The body side outer comprises a front part constituting a part disposed in front of a vehicle body and a rear fender part constituting a part disposed in the rear of the vehicle body. The front part and the rear fender part are joined by welding. After welding together the front part and the rear fender part to construct the body side outer, the various kinds of inner parts are joined to the body side outer by welding. Then the body side of the automotive vehicle is assembled.

In the above assembling operation, as shown in FIG. 1, there is provided a transfer apparatus 205 for transferring a front part 201 and a rear fender part 203 in a state of laying down, for example, as disclosed in Japanese Patent Application Laid-Open Publication No. 7-96397, and a plurality of welding robots 207 for welding the parts 201 and 203 to each other and welding the inner part to the parts 201 and 203.

The transfer apparatus 205 is provided with two transfer bars 209 extending in the transfer direction and capable of moving in the longitudinal direction, and fingers 211 serving as a work-piece receiver for supporting the parts 201 and 203 and disposed on the transfer bar 209. On a table 213 disposed below the transfer bar 209, there is provided a jig 215 which ascends the parts 201 and 203 so as to be apart from the finger 211 and fixedly holds the parts so as to position them at a time of welding. The jig 215 is provided in such a manner as to vertically movable by a lifter. When the finger 211 holding the parts 201 and 203 moves forward together with motion of the transfer bar 209, the parts 201 and 203 are also transferred forward, in a state that the jig 215 is unclamping the parts 201 and 203.

The assembling operation comprises some stages. In a first stage, the front part 201 and the rear fender part 203 are set on the transfer line and fixed and held by the jig 215 which is in an ascent state, and thereafter, both the parts 201 and 203 are temporarily welded to each other by using the welding robots 207. In a second stage, the connection portions for connecting the parts 201 and 203 to each other and small parts which are already assembled to the parts 201 and 203 are additionally welded. Next, in a third stage, the various kinds of inner parts are set to the parts 201 and 203 and are temporarily welded to each other, and thereafter, in a fourth stage, the parts are additionally welded, whereby the welding of the body side is completed.

Finally, in a fifth stage, the body side which is completely welded is stood up by a stand-up apparatus having an oil hydraulic cylinder for an upright positioning mechanism, and thereafter is hung up by the stand-up apparatus to be transferred to the following stage.

However, in the conventional operation of assembling the body side, there are following problems.

(1) In the welding operation for the additional welding by the plurality of welding robots, the welding robots interfere with each other due to an obstruction of the jig 215, thereby deteriorating the operation efficiency.

(2) Since the work-piece W to be assembled as the front part 201 or the rear fender part 203 is supported by the jig 215 at left and right side bottom portions thereof in a state that the work-piece W is laying down in a horizontal direction with respect to the transfer apparatus, the center portion of the work-piece W is bent due to the gravitational force and is deformed. Then, since the welding operation is performed in the bent state, the assembling accuracy is deteriorated. When the jig for supporting the center portion in order to prevent the center portion from bending, the cost is increased, and the operable area for the welding robot is narrowed.

(3) Since at a time of performing the welding operation and the transfer operation, it is necessary to provide a plurality of special jigs 215 and fingers 211 for fixing and holding the bottom surface of the works as the front parts 201 and the rear fender parts 203 in the laying down state the facility cost is required. Particularly, when a plurality types of automotive vehicle are produced in the same line, it is necessary to provide the jigs and fingers for a wide ranged usage so that the facility cost is extremely high. Further, the stand-up apparatus for standing the work up after welding requires also a high cost.

SUMMARY OF THE INVENTION

The present invention has been achieved with such points in view.

It therefore is an object of the present invention to provide an assembling apparatus for assembling a body side of an automotive vehicle with a reduced cost, an improved operation efficiency and an improved transfer accuracy in transferring body side at a time of assembling the body side.

It is another object of the present invention to perform a welding operation with a high accuracy without an exclusive jig for positioning a work-piece at a welding position.

Further, it is still another object of the present invention to easily use an apparatus for various purposes so as to achieve a cost reduction by properly determining a welding position against a work-piece transferred to a predetermined welding stage position without using a positioning jig.

To achieve the objects, according to an aspect of the present invention, there is provided an assembling apparatus assembling a body side of an automotive vehicle, comprising; a moving body provided in a transfer line; a clamp member provided on the moving body for fixing and positioning a body side outer in an upright position, in which the body side outer is fixed in such a manner that a roof rail end of the body side outer is positioned substantially above the side sill end of the body side outer; and a welding robot disposed in a side of the transfer line, the welding robot assembling the body side by welding the body side outer positioned by the clamp member.

In accordance with the assembling apparatus for assembling the body side of the automotive vehicle, since the lower end of the side sill can be made the same shape between different kinds of cars, the lower end of the side sill can be fixed in an upright position, so that it is unnecessary to provide an exclusive jig for each of the kinds of cars for fixing and holding the body side outer. Accordingly, the fixing device for positioning and fixing the body side outer can be easily simplified and used for various kinds of cars. Further, since the plurality of welding robots perform a welding operation with respect to the body side outer in an upright position from both sides thereof, interference between the robots can be avoided so that the operation efficiency can be improved. Further, since the body side outer is transferred and welded in an upright position corresponding to a direction in which a bending rigidity in a cross section of the work-piece becomes maximum with respect to a direction of operating the own weight of the body side outer, the body side outer is hard to be deformed in comparison with the state of horizontally laying down, so that the assembling accuracy can be improved and a space for operation can be reduced.

According to another aspect of the present invention there is provided an assembling method assembling a body side of an automotive vehicle, comprising the steps of: clamping the body side by a clamp member provided on the moving body for fixing and positioning a lower end of a side sill in an upright position, in which the body side outer is fixed in such a manner that a roof rail end of the body side outer is positioned substantially above the side sill end of the body side outer; and transferring the body side in the upright position by a moving body provided with the clamp member and provided in a transfer line.

In accordance with the transfer method mentioned above, the same function and effect as those of the first aspect mentioned above can be obtained.

According to still another aspect of the present invention, there is provided a workpiece positioning apparatus, comprising: a first handling robot provided with a robot hand for moving a first work-piece to a predetermined welding position in a state of gripping the first work-piece by a grip portion; a positioning mechanism disposed at the predetermined welding position and positioning and fixing the robot hand of the first handling robot in a state of moving the first work-piece to the predetermined welding position by means of a positioning portion of the robot hand; and a second handling robot provided with a robot hand in which a positioning portion is positioned and fixed to a positioned portion of the robot hand of the first handling robot positioned and fixed to the positioning mechanism by moving a second work-piece to be welded and connected to the first work-piece to the predetermined welding and connecting portion of the first work-piece in a state of being gripped by the gripping portion.

In accordance with the structure mentioned above, since the robot hand of the first handling robot is positioned and fixed to the positioning mechanism in a state of gripping the first work-piece and the robot hand of the second handling robot gripping the second work-piece is positioned to the above robot hand, the rigidity of the respective robot hands is increased so as to improve the positional accuracy, so that the welding operation can be performed with a high accuracy.

According to further aspect of the present invention, there is provided a work-piece positioning apparatus, comprising: first and second handling robots respectively provided with robot hands for gripping first and second work-pieces to be welded and connected to each other by means of a grip portion, each of the robot hands of the handling robots is provided with a positioning portion for positioning and fixing the first and second work-pieces to each other in a state of confronting the work-pieces to each other while gripping the first and second work-pieces; and a welding electrode for welding and connecting the first and second work-pieces to each other in a state of positioning and fixing the work-pieces by means of the positioning portion.

In accordance with the structure mentioned above, since the robot hands for gripping the first and second work-pieces are positioned and fixed to each other by means of the positioning portion, the rigidity of the respective robot hands is increased so as to improve the positional accuracy, so that the welding operation by means of the welding electrode can be performed with a high accuracy.

According to further aspect of the present invention, there is provided a work-piece positioning apparatus, comprising: a first handling robot having a robot hand gripping a first work-piece; and a second handling robot having a robot hand gripping a second work-piece to be welded with the first work-piece, wherein the first work-piece and the second work-piece are positioned face to face each other in a state of confronting the first and second work-pieces.

In accordance with the positioning method mentioned above, since the robot hands gripping the first and second work-pieces are relatively positioned and fixed to each other, the rigidity of the respective robot hands is increased so as to improve the positional accuracy, so that the welding operation can be performed with a high accuracy.

According to still further aspect of the present invention, there is provided a welding apparatus for a part of an automotive vehicle for welding and connecting a sub part to a main part transferred to a predetermined welding position by means of a transfer apparatus, comprising: a handling robot for positioning and setting the sub part to a predetermined position of the main part in a state of gripping the sub part by a gripping portion; and a welding robot for welding and connecting the sub part and the main part positioned and set by the handling robot to each other.

In accordance with the structure mentioned above, since the sub part gripped by the handling robot is positioned and set to the main part on the transfer apparatus, and the welding operation can be performed in this state by means of the welding robot, no jig for positioning the main part on the transfer apparatus is required.

Furthermore, according to an aspect of the present invention other than the aspects described above, there is provided a spot welding method, comprising the steps of: stopping a vibration of the work-piece by pressurizing and holding a predetermined portion of the work-piece transferred to the position of the welding stage by a pair of electrode tips in the welding gun provided in the welding robot; measuring a position of the work-piece at a time of contact by the electrode tip by supplying a weak current in a state of bringing the electrode tip contact with the work-piece after removing the pressurizing and holding motion with respect to the work-piece by the both electrode tips; correcting a welding position against the work-piece on the basis of the measured position of the work-piece and a predetermined normal welding position against the work-piece by the welding gun so as to weld the work-piece.

In accordance with the spot welding method mentioned above, since the vibration of the work-piece generated by the transfer is stopped by pressurizing and holding by the pair of electrode tips to each other of the welding gun, and the following welding operation against the work-piece is performed after the work-piece position is measured by contacting the electrode tip with the work-piece and the welding position is corrected, no exclusive positioning jig for the work-piece and no exclusive detector for detecting the work-piece position are required, so that the cost reduction can be achieved.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
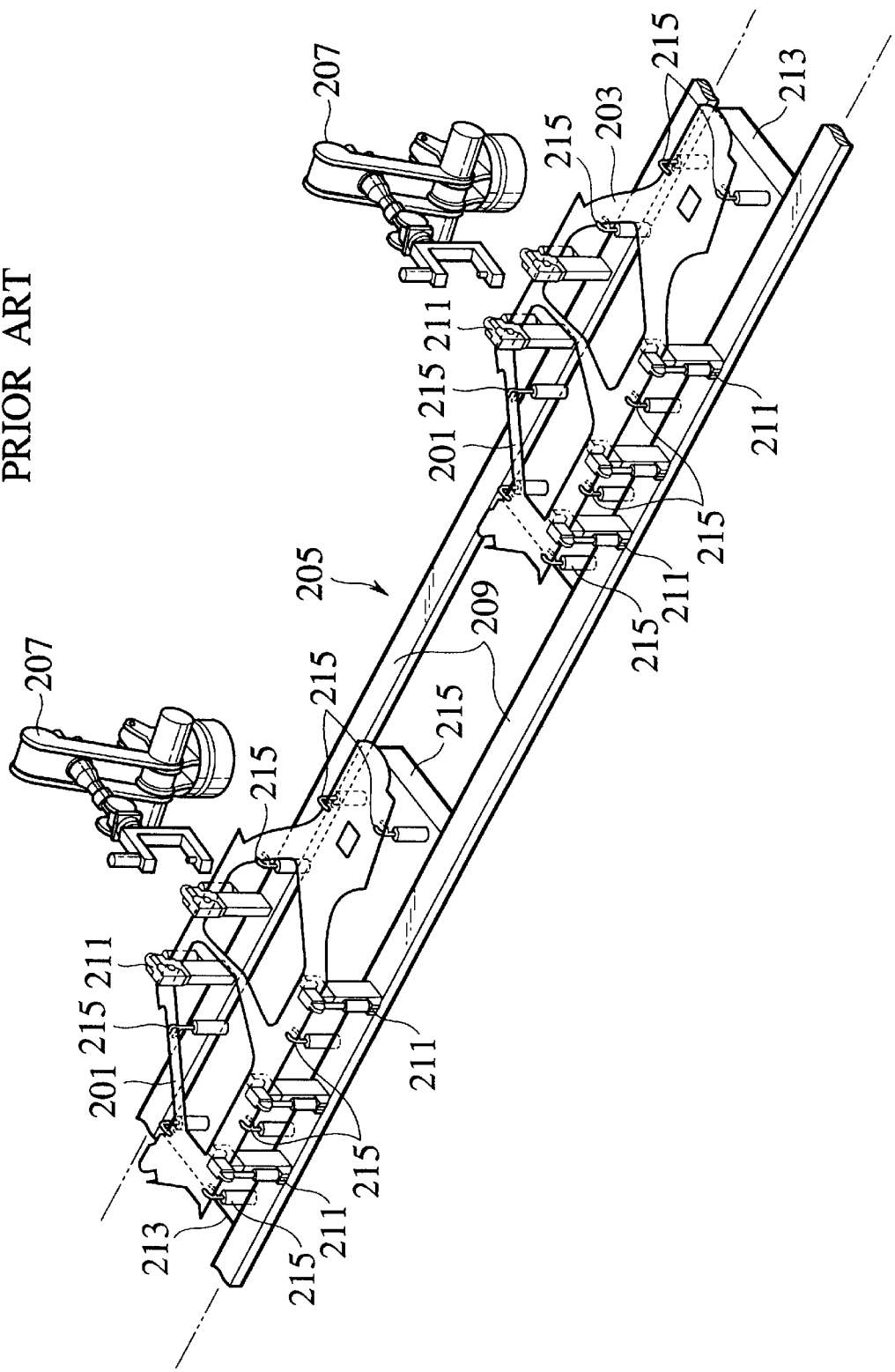
FIG. 1 is a perspective view which schematically shows a transfer apparatus for transferring a body side of an automotive vehicle in accordance with the related art.

Below are described several preferred embodiments of the present invention with reference to the accompanying drawings. Like members are designated by like reference characters.

An assembling apparatus for assembling a body side of an automotive vehicle in accordance with an embodiment of the present invention is structured in such a manner as to position and fix the body side on a transfer apparatus constituting a transfer line in an upright position. In other words, a roof rail end is set to be an upper portion and a side sill end is set to be a lower portion. A plurality of welding robots are disposed in both sides of the transfer apparatus. The body side comprises a front part in front of a vehicle body and a rear fender part in the rear of the vehicle body as parts constituting a body side outer, and is structured by respectively welding front inner parts and wheel house rear pillar inner parts to the body side outer constituted by welding the front part and the rear fender part to each other.

Figure 2:
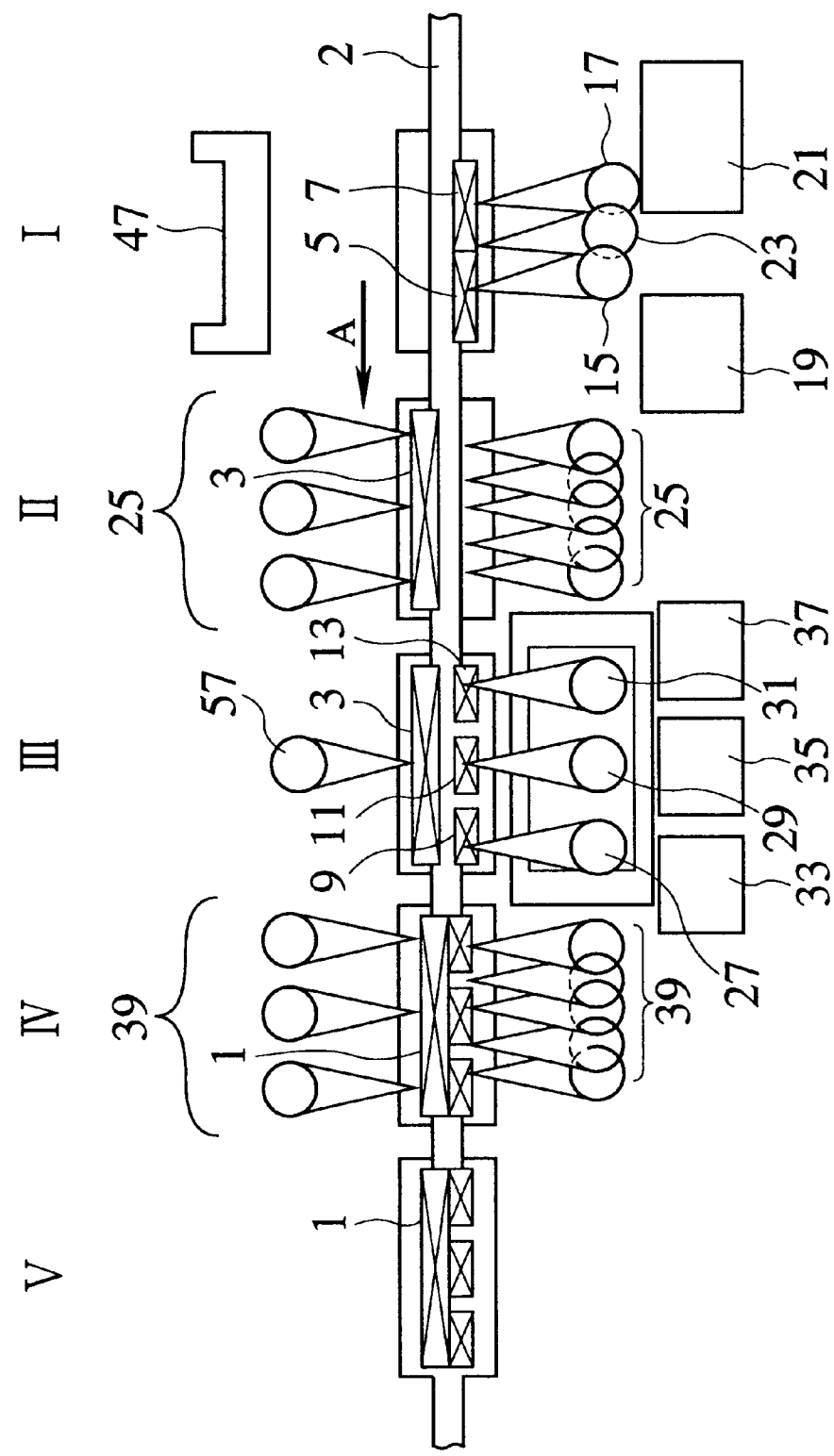
FIG. 2 is a plan view schematically showing a total structure of a welding line of a work-piece to which an assembling apparatus for assembling a body side of an automotive vehicle in accordance with an embodiment of the present invention.

FIG. 2 is a plan view schematically showing a structure of a whole welding line for assembling a body side of an automotive vehicle in accordance with the embodiment of the present invention. The work-piece to be operated here is a body side 1 constituting a side surface of the vehicle body, and the body side 1 is transferred to the left direction as shown by arrow A. This transfer is effected by a transfer apparatus 2 comprising a chain conveyor or the like able to transport the body side in an upright position wherein a roof rail end is positioned substantially vertically over a side sill end.

The body side 1 is structured such that a body side outer 3 comprises a front outer part 5 and a rear fender part 7 welded together. The body side 1 also includes a front pillar inner part 9, a center pillar inner part 11, and a rear pillar inner part 13 respectively welded to the body side outer 3.

In a first stage I in the welding line mentioned above, handling robots 15 and 17 grip the front outer part 5 and the rear fender part 7 disposed on temporary tables 19 and 21 and each robot 15, 17 disposes its respective part at a predetermined welding position on the transfer apparatus 2, whereupon a welding robot 23 temporarily welds together the outer parts 5 and 7.

In a position opposite to the handling robots 15 and 17 with respect to the transfer apparatus 2 is a positioning mechanism 47 for positioning the handling robots 15 and 17 at a time of positioning a work-piece.

In a second stage II, an additional welding operation is performed by welding robots 25 which are appropriately disposed at both sides of the transfer apparatus 2 as shown in FIG. 2 with respect to the temporarily welded body side outer 3.

In a third stage III, handling robots 27, 29 and 31 set the front pillar inner part 9, the center pillar inner part 11 and the rear pillar inner part 13 disposed on temporary tables 33, 35 and 37 at a predetermined welding position on the transfer apparatus 2 with respect to the body side outer 3 and a welding robot 38 temporarily welds the respective parts 9, 11 and 13 to the body side outer 3.

In a fourth stage IV, a plurality of welding robots 39 which are appropriately disposed at both sides of the transfer apparatus 2 as shown in FIG. 2 additionally weld the temporarily welded portions from both sides of the body side 1 located on the transfer apparatus 2, and all the welding operations are completed in this stage, thereby obtaining the body side 1. In a following fifth stage V, the body side 1 obtained in the fourth stage mentioned above is carried out by a lifter 133 shown in FIG. 15.

Figure 3:
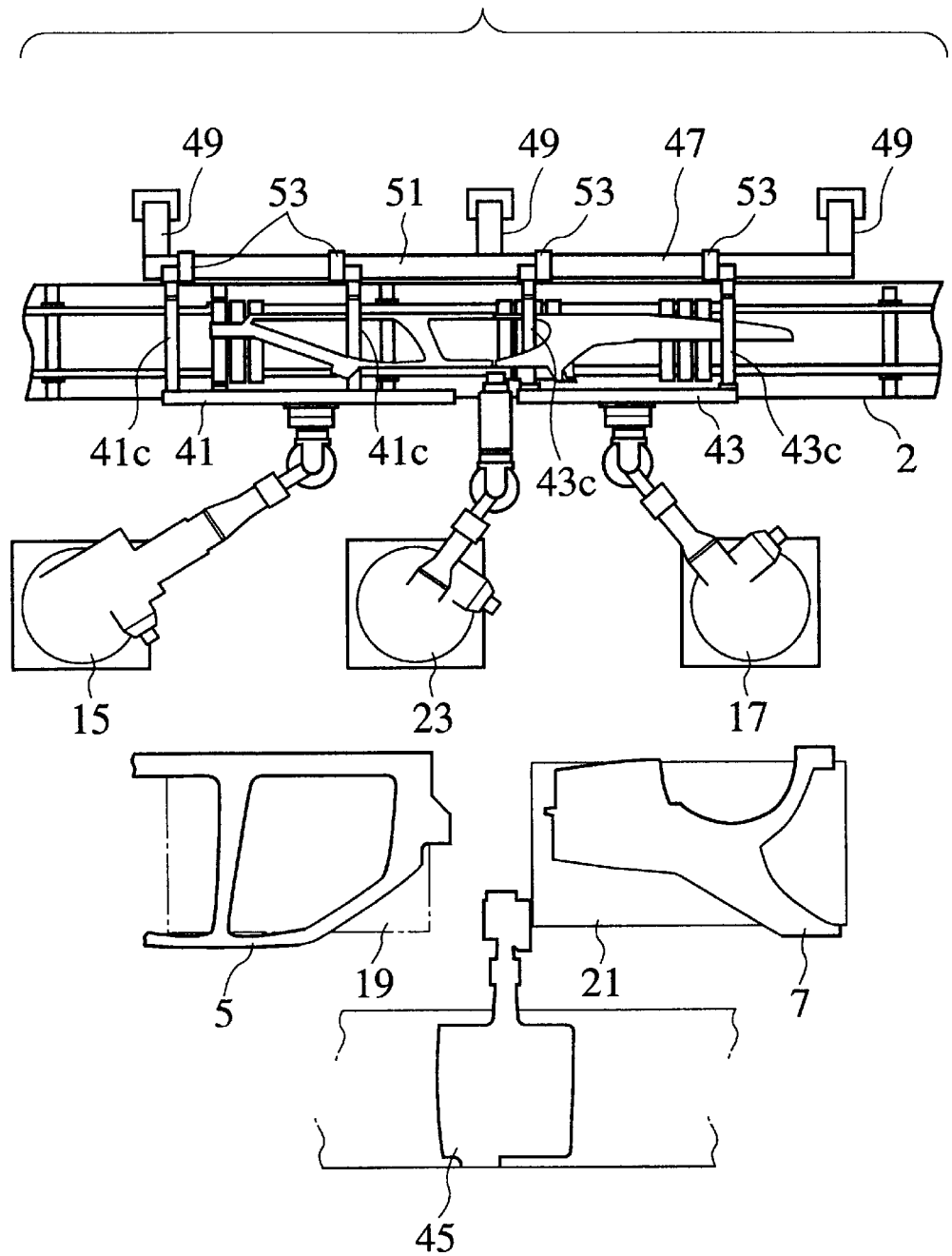
FIG. 3 is a plan view which shows a work-piece positioning apparatus in a first stage of the welding line shown in FIG. 2.
Figure 4:
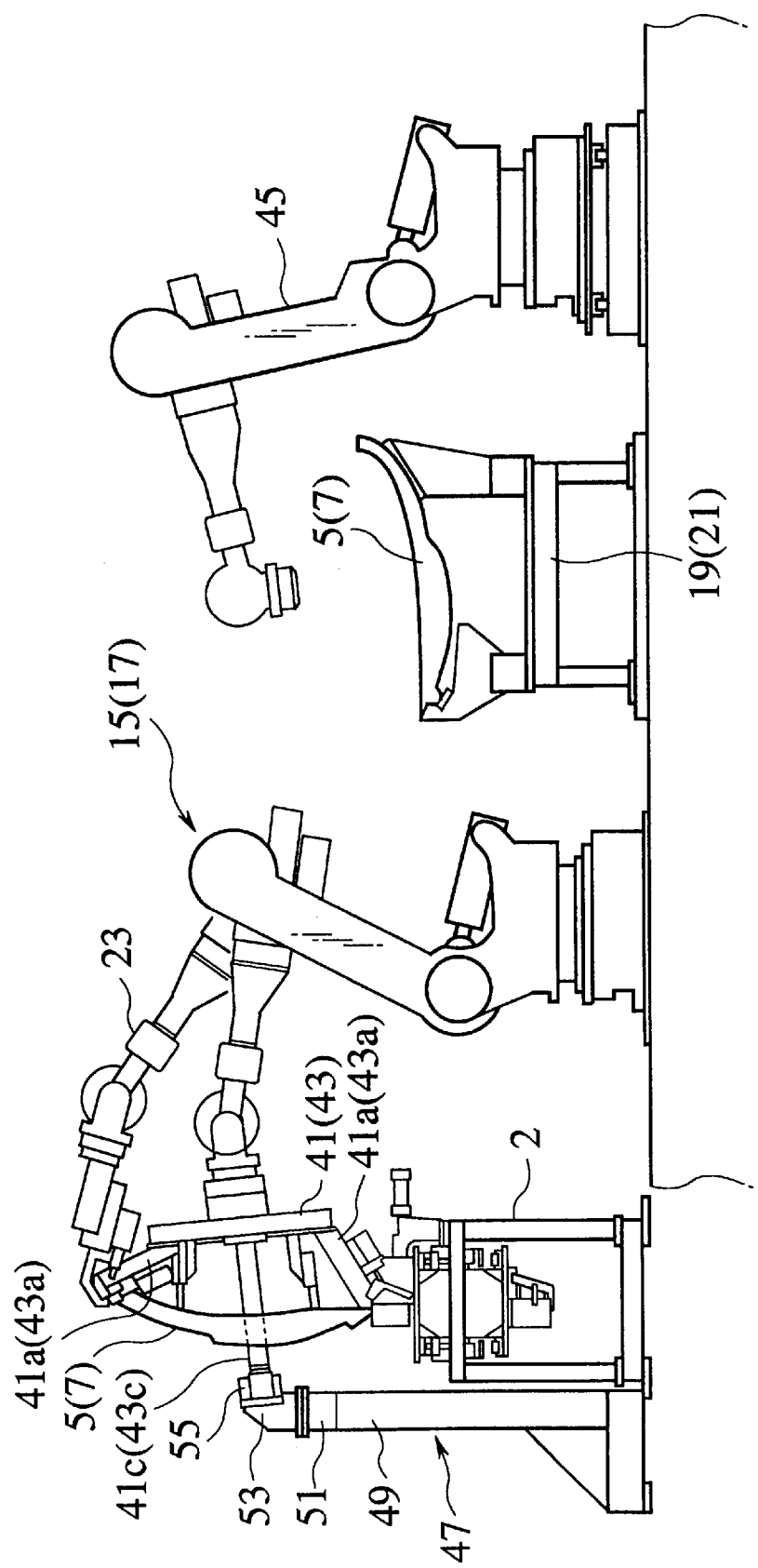
FIG. 4 is a side elevational view which shows the work-piece positioning apparatus as seen from a front side to a rear side in the transfer direction of the work-piece in FIG. 3.
Figure 5:
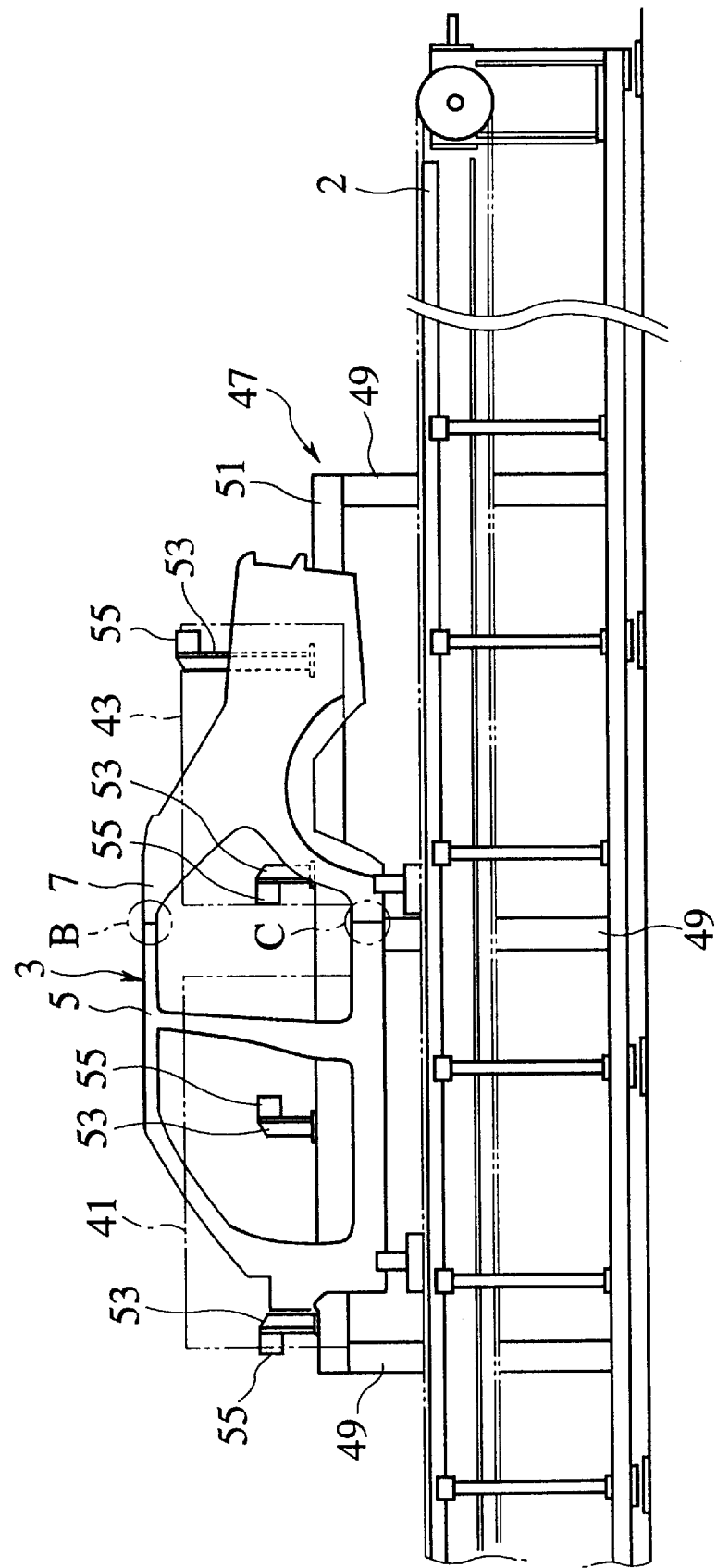
FIG. 5 is a plan view of the work-piece positioning apparatus which shows a work-piece on the transfer apparatus in FIG. 3 as seen from a handling robot.

FIG. 3 is a plan view which shows details of the first stage I of the welding line mentioned above, and an assembling apparatus for assembling the body side in accordance with a first embodiment of the present invention is applied to this stage. FIG. 4 is a view as seen from a front side (a left side in the drawing) to a rear side (a right side in the drawing) in the transfer direction of the work-piece in FIG. 3 and FIG. 5 is a view which shows the work-piece on the transfer apparatus 2 as seen from the perspective of the handling robots 15 and 17.

The handling robots 15 and 17 are provided with robot hands 41 and 43 with grip portions 41a and 43a provided in upper and lower ends of the robot hands 41 and 43 as shown in FIG. 4 Positioning arms 41c and 43c are provided to serve as positioning portions in a center portion in the vertical direction. Two positioning arms 41c and 43c are respectively provided in each of the robot hands 41 and 43 as shown in FIG. 3.

The grip portions 41a and 43a respectively grip the front outer part 5 and the rear fender part 7 disposed on the temporary tables 19 and 21 to move these parts to the transfer apparatus 2. A robot 45 disposed in a right side of the temporary tables 19 and 21 in FIG. 4 sets the front outer part 5 and the rear fender part 7 on the temporary tables 19 and 21, and is disposed in such a manner as to move in the same direction as the transfer direction of the transfer apparatus 2. In this case, the grip portions 41a and 43a are omitted in FIG. 3.

The positioning mechanism 47 for positioning the positioning arms 41c and 43c of the handling robots 15 and 17 mentioned above is provided in the side portion opposite to the handling robots 15 and 17 in the transfer apparatus 2. In the positioning mechanism 47, as shown in FIG. 5, three supports 49 are provided along the transfer apparatus 2, and each of the supports 49 is connected to each other by a connecting member 51 extending along the transfer apparatus 2 at the upper end. Further, four supporting brackets 53 are projected upward on the connecting member 51, and a positioning portion 55 for positioning each of the robot arms 41 and 43 by inserting the front ends of the respective two positioning arms 41c and 43c therein is formed on the side portion of the upper end of the supporting bracket 53.

The position and the length of the supporting bracket 53 is set such that the positioning portion 55 is positioned so as to not interfere with the work-piece (the front outer part 5 and the rear fender part 7) as shown in FIG. 5, whereby the positioning operation of the positioning arms 41c and 43c can be performed from the side opposite to the work-pieces 5 and 7 with respect to the positioning portion 55. In a state that the positioning operation is performed, the welding robot 23 temporarily welds a B portion and a C portion shown in FIG. 5 which correspond to the connecting portions between the front outer part 5 and the rear fender part 7.

Next, an operation by the work-piece positioning apparatus in the first stage I mentioned above will be described below. The handling robots 15 and 17 respectively grip the front outer part 5 and the rear fender part 7 on the temporary tables 19 and 21 by the grip portions 41a and 43a so as to move the predetermined welding position on the transfer apparatus 2. At this time, the respective positioning arms 41c and 43c of the handling robots 15 and 17 are positioned and fixed by fitting the front ends thereof to the positioning portion 55 of the positioning mechanism 47. Due to this positioning and fixing, the front outer part 5 and the rear fender part 7 are set to the normal welding and connecting position to each other. In this state, the B portion and the C portion shown in FIG. 5 are welded by the welding robot 23 so that the front outer part and the rear fender part 7 are temporarily welded together.

As mentioned above, since the handling robots 15 and 17 are positioned and fixed to the positioning mechanism 47 at a time of setting the work-piece to a predetermined welding position, the rigidity of the robot hands 41 and 43 is increased and the positional accuracy is improved, so that no exclusive jig for positioning the work-piece is required and the cost reduction can be achieved. Further, by replacing the robot hands 41 and 43 the apparatus can be applied to the other kinds of cars and can be applied to a wide use.

In the second stage II, the additional welding operation is performed by the welding robot 25 disposed in both sides of the transfer apparatus 2 with respect to the body side outer 3. This welding operation comprises welding together the respective parts 5 and 7].

Figure 6:
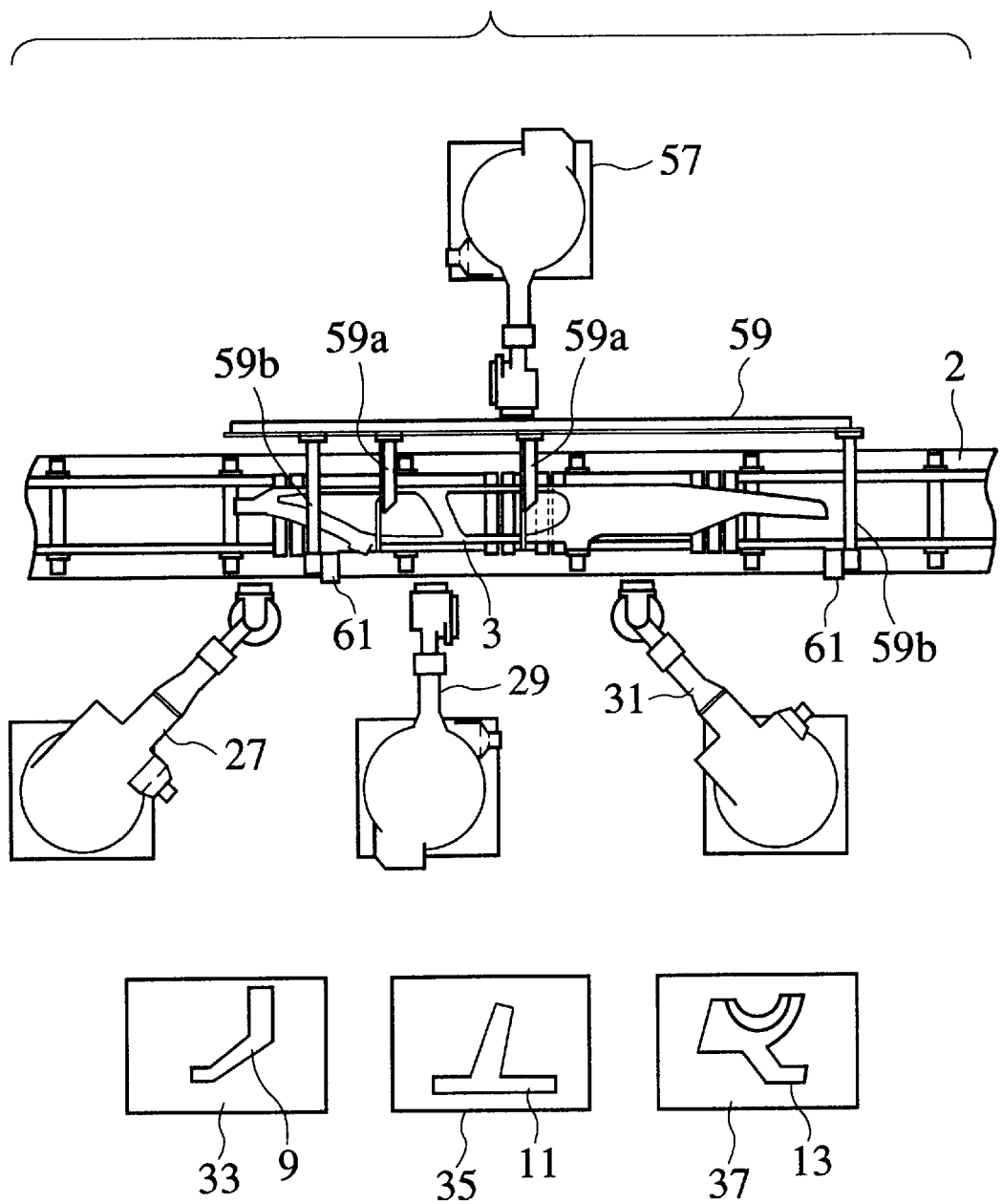
FIG. 6 is a plan view which shows the work-piece positioning apparatus in a third stage of the welding line as shown in FIG. 2.
Figure 7:
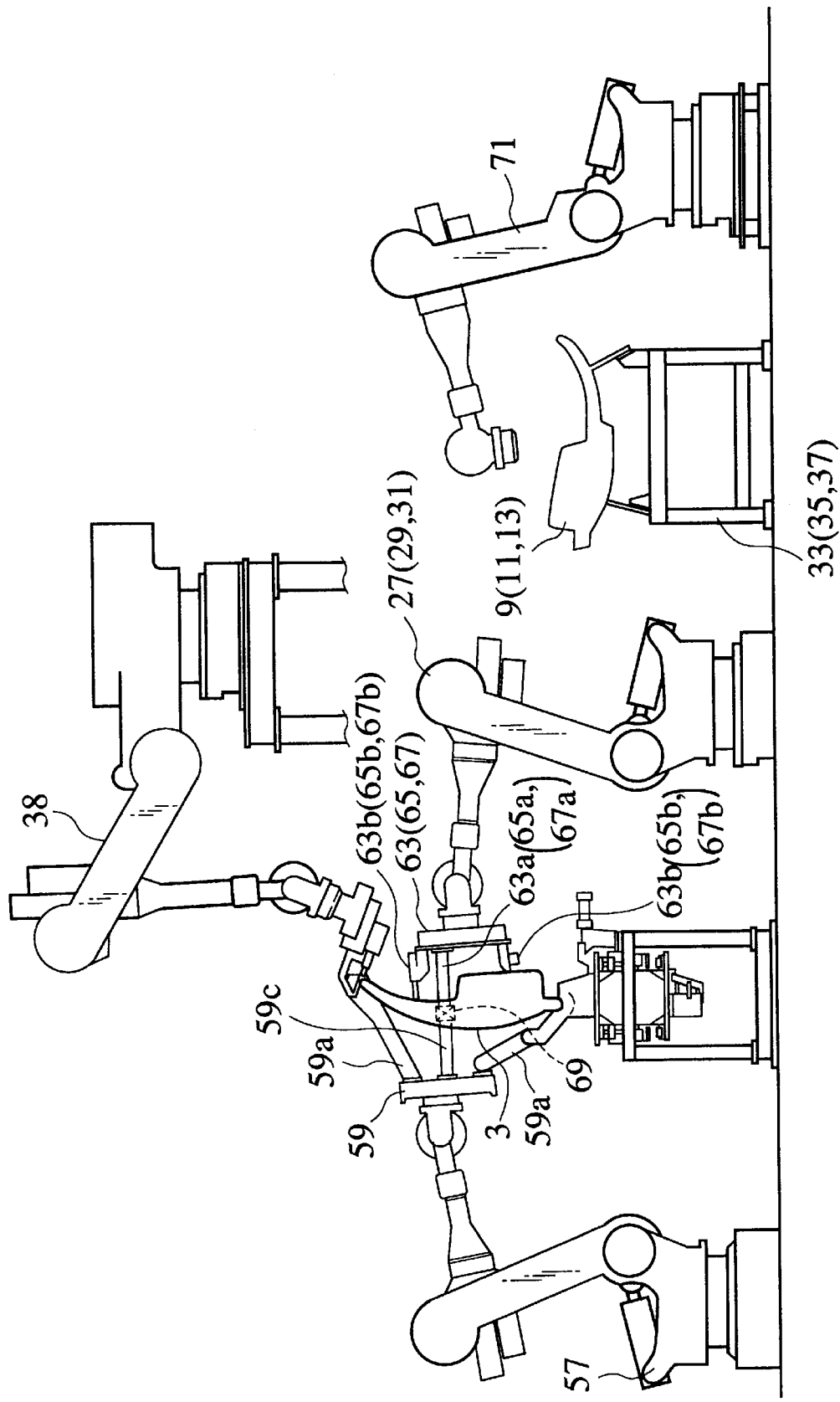
FIG. 7 is a side elevational view which shows the work-piece positioning apparatus as seen from the front side to the rear side in the transfer direction of the work-piece in FIG. 6.

FIG. 6 is a plan view which shows the details of the third stage III of the welding line as shown in FIG. 2 and FIG. 7 is a view as seen from the front side (the left side in the drawing) to the rear side (the right side in the drawing) in the transfer direction of the work-piece in FIG. 6.

A handling robot 57 serving as a first handling robot is provided in the right side facing the transfer direction of the transfer apparatus 2 in the third stage III mentioned above. The handling robot 57 is provided with a robot hand 59, and as shown in FIG. 7, a grip portion 59a for gripping the body side outer 3 corresponding to a first work-piece which is completed in the welding and connecting operation by additionally welded in the second stage II on the transfer apparatus 2 is provided in both vertical ends of a robot hand 59.

A positioning arm 59b serving as a positioning portion is provided at a position apart from the body side outer 3 near the both right and left ends of the robot hand 59, as shown in FIG. 6, and projects toward the handling robots 27, 29 and 31. A positioning mechanism 61 is provided on an opposite side of the transfer apparatus 2 with respect to the handling robot 57 Body side outer 3, gripped by robot hand 59, is positioned and fixed by inserting and fitting the front end of the positioning arm 59b into the positioning mechanism 61. The positioning arm 59b and the positioning mechanism 61 mentioned above are omitted in FIG. 7.

Further, as shown in FIG. 7, the robot hand 59 is provided with a combination arm 59c serving as a positioned portion projecting toward the handling robots 27, 29 and 31 near the center portion in the vertical direction in correspondence to respective robot hands 63, 65 and 67 of the handling robots 27, 29 and 31. The robot hands 63, 65 and 67 are omitted in FIG. 6. On the contrary, combination arms 63a, 65a and 67a corresponding to a positioning portion in which both arms are combined so as to be positioned and fixed by inserting and fitting a front end thereof to a fitting portion 69 are respectively provided in the robot hands 63, 65 and 67.

The robots hands 63, 65 and 67 mentioned above are provided with grip portions 63b, 65b and 67b for gripping the front pillar inner part 9, the center pillar inner part 11 and the rear pillar inner part 13 corresponding to a second work-piece in the vertical portions, and move the respective inner parts 9, 11 and 13 disposed on the temporary tables 33, 35 and 37 to the predetermined welding position of the body side outer 3 on the transfer apparatus 2 with gripping the respective inner parts 9, 11 and 13. A robot 71 (which is not illustrated in FIG. 6) disposed in the right portion of the temporary tables 33, 35 and 37 in FIG. 6 is used for setting the respective inner parts 9, 11 and 13 to the temporary tables 33, 35 and 37, and is disposed in such a manner as to move in the same direction as the transfer direction of the transfer apparatus 2.

In this case, the respective combination arms 59c, 63a, 65a and 67a are disposed at a position of not interfering the body side outer 3 in a state of positioning the first handling robot 57 to the positioning mechanism 61.

Next an operation by the work-piece positioning apparatus in the third stages 111 mentioned above will be described below. When the completely welded body side outer 3 exiting the second stage II is transferred to the third stage III, the handling robot 57 moves the robot hand 59 to the body side outer 3 so as to grip the body side outer 3 by the gripping portion 59a, and inserts and fits the positioning arm 59b to the positioning mechanism 61 so as to position and fix the robot hand 59.

Next, the gripping portions 63b, 65b and 67b in the robot hands 63, 65 and 67 of the handling robots 27, 29 and 31 respectively grip the front pillar inner part 9, the center pillar inner part 11, and the rear pillar inner part 13 on the temporary tables 33, 35 and 37 The handling robots 27, 29, and 31 then move their respective work-pieces to the predetermined welding portions of the body side outer 3 on the transfer apparatus 2. At this time, the front ends of the combination arms 63a, 65a and 67a of the robot hands 63, 65 and 67 are inserted and fitted to the front end of the combination arm 59c of the handling robot 57 so as to combine both the arms to each other. Accordingly, the robot hands 63, 65 and 67 respectively gripping the inner parts 9, 11 and 13 are positioned and fixed with respect to the robot hand 59 gripping the body side outer part 3.

As mentioned above, since the robot hand 59 gripping the body side outer 3 on the transfer apparatus 2 is positioned and fixed to the positioning mechanism 61, the rigidity of the robot hand 59 is increased so that the positional accuracy is improved. Further, since the robot hands 63, 65 and 67 gripping the inner parts 9, 11 and 13 are combined with the positioned and fixed robot hand 59 through the respective combination arms 59c and 63a, 65a and 67a, the rigidity of the robot hands 63, 65 and 67 can be increased and the positional accuracy thereof can be improved.

Accordingly, as the same manner as that of the first embodiment mentioned above, no exclusive jig for positioning the work-piece is required so that the cost reduction can be achieved. Further, by replacing the respective robot hands 59 and 63, 65 and 67, the apparatus can be applied to the other kinds of cars so that the apparatus can be used widely.

Figure 8:
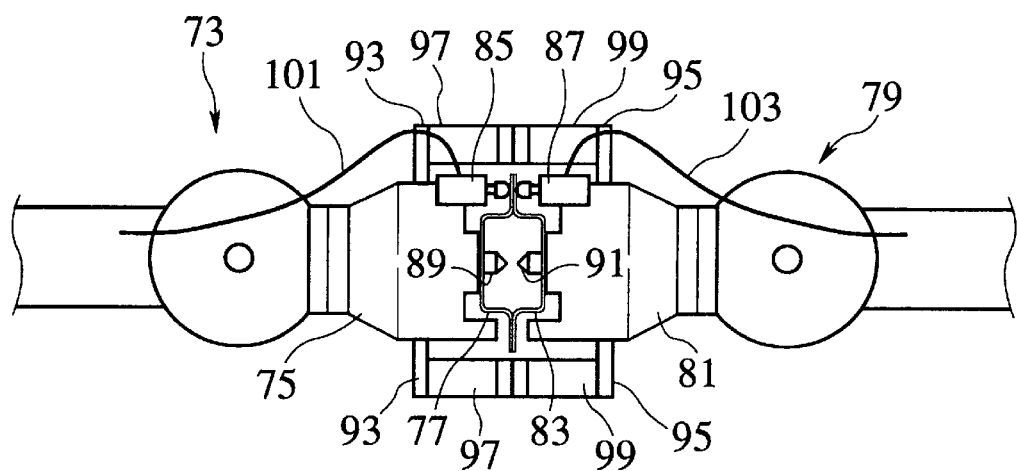
FIG. 8 is a view which shows details of a work-piece positioning apparatus in accordance with a third aspect of the present invention.

FIG. 8 shows a work-piece positioning apparatus in accordance with a second embodiment of the present invention. The embodiment is structured such that in a state that a robot hand 75 of a handling robot constituting a first handling robot grips a first work-piece 77 and a robot hand 81 of a handling robot 79 constituting a second handling robot grips a second work-piece 83 Both the robot hands 75 and 81 are positioned and fixed to each other and both the work-pieces 77 and 83 are welded and connected to each other by a built in welding electrodes 85 and 87.

Locating clamps 89 and 91 for respectively gripping the work-pieces 77 and 79 are provided in the center of the front end of the robot hands 75 and 81. The locating clamps 89 and 91 are structured such that, in a state of inserting locating holes formed on the respective work-pieces 77 and 83, the built in clamping hooks project to a side direction with forward moving and thereafter rearward move so that the clamping hooks and the robot hands 75 and 81 hold the work-pieces 77 and 83 therebetween.

Supporting brackets 93 and 95 are provided in both side portions of the front ends of the robot hands 75 and 81 in such a manner as to project to a side direction Combination units 97 and 99 serve as a positioning portion for positioning and fixing the robot hands 75 and 81 to each other by combining the front ends to each other and are provided opposite each other on the respective supporting brackets 93 and 95.

The welding electrodes 85 and 87 for welding the work-pieces 77 and 83 to each other are respectively provided in the robot hands 75 and 81 positioned inward of the combination units 97 and 99 in the upper side of FIG. 8 Welding cables 101 and 103 are respectively connected to the welding electrodes 85 and 87. The combination units 97 and 99 mentioned above serve to bear the pressing force by the welding electrodes 85 and 89.

Next, the operation of the work-piece positioning apparatus shown in FIG. 8 will be described below. The robot hands 75 and 81 grip the work-pieces 77 and 83 disposed, for example, on the temporary table (not shown) using locating clamps 89 and 91 In this state, the respective hands 75 and 81 face each other so as to combine and connect the combination units 97 and 99 to each other. At this time, the work-pieces 77 and 83 are likewise disposed to face each other to permit the work-pieces 77 and 83 to be welded to each other. The welding operation is performed by the welding electrodes 85 and 87.

As mentioned above, in the work-piece positioning apparatus shown in FIG. 8, since the robot hands 75 and 81 for respectively gripping the work-pieces 77 and 83 are combined by the combination units 97 and 99 so as to position and fix the work-pieces, the rigidity of the robot hands 75 and 81 is increased and the positional accuracy is improved. This eliminates the need for an exclusive jig for positioning the work-pieces and a cost reduction can be achieved. Further, in this embodiment, since the locating clamps 89 and 91 and the welding electrodes 85 and 87 are respectively provided in the robot hands 75 and 81, there is no need to independently prepare the respective robots for clamping the work-piece and for welding, so that the further cost reduction can be achieved.

Figure 9:
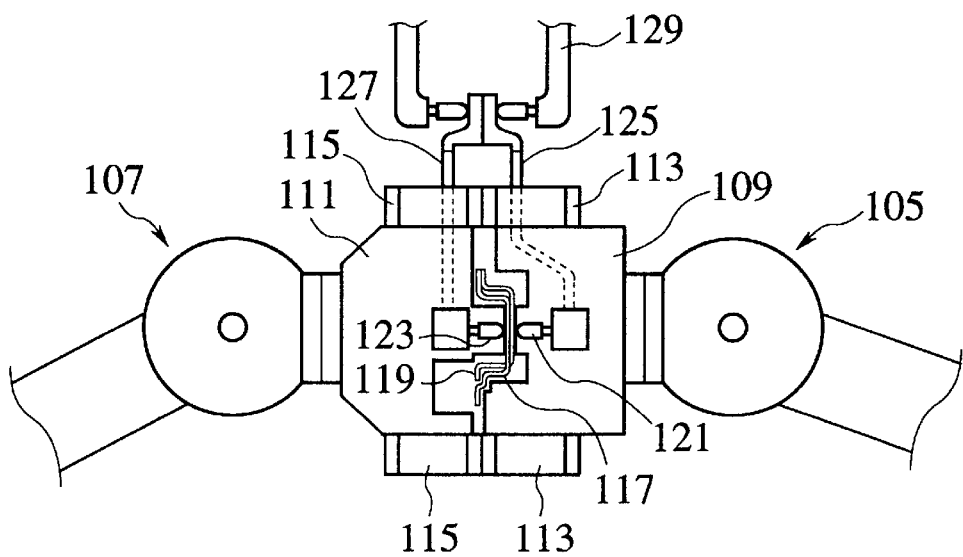
FIG. 9 is a view which shows details of a work-piece positioning apparatus in accordance with a modified embodiment of the embodiment shown in FIG. 8.

FIG. 9 shows a modified embodiment of the embodiment shown in FIG. 8. Combination units 113 and 115 are respectively provided in both side portions of robot hands 109 and 111 of first handling robot 105 and second handling robot 107. Welding electrodes 121 and 123 for welding and connecting first and second work-pieces 117 and 119 are respectively provided within the respective robot hands 109 and 111. The welding electrodes 121 and 123 are connected to electric power supply electrodes 125 and 127 provided in the side portion (the upper portion in FIG. 8) of the robot hands 109 and 111 in a projecting manner in an electrically conductive state, and power is supplied to the electric power supply electrodes 125 and 127 by a electric power supply robot 129.

Figure 10:
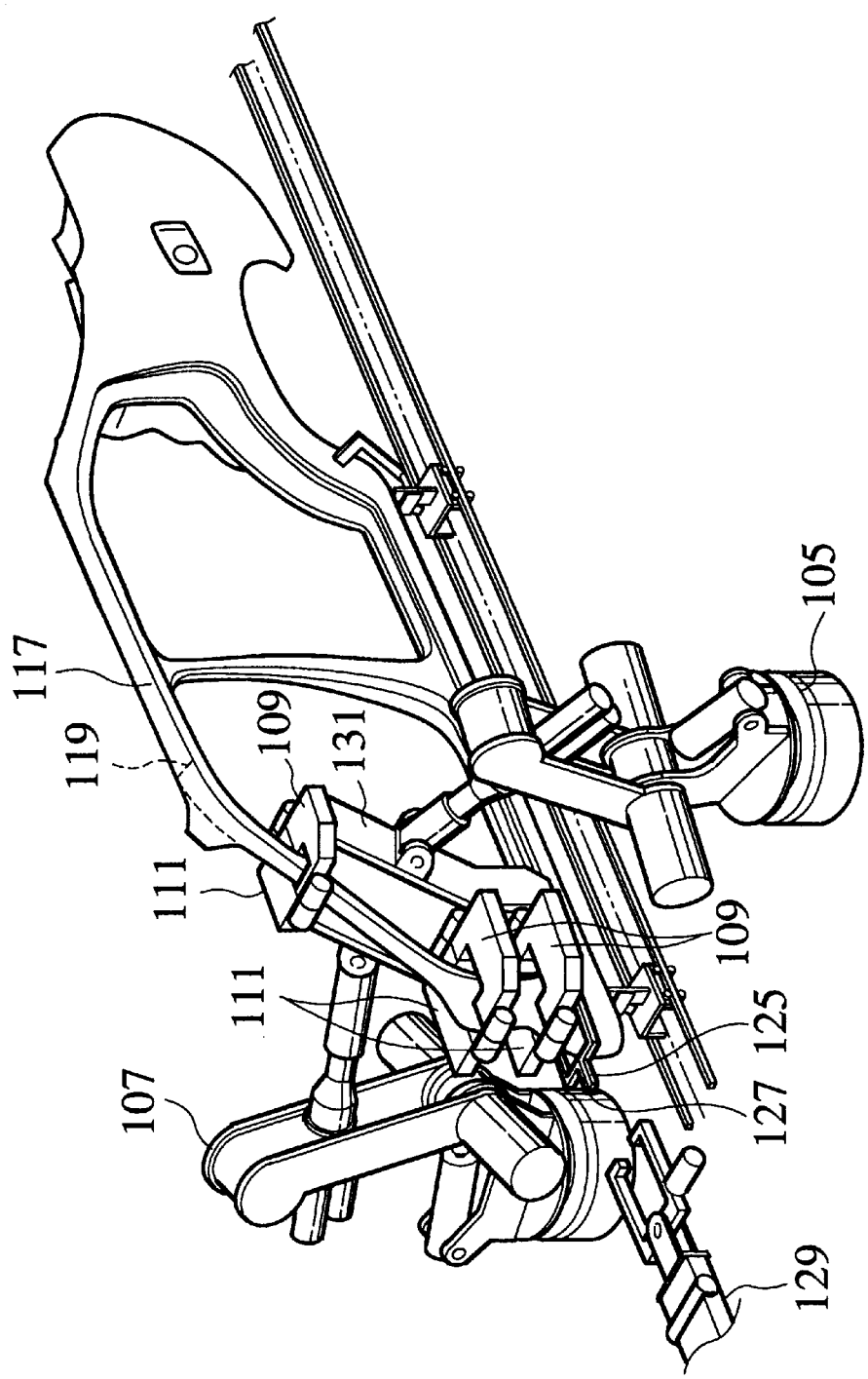
FIG. 10 is a perspective view which concretely shows a total structure of the embodiment shown in FIG. 9.

FIG. 10 concretely shows the embodiment shown in FIG. 9. The handling robot 105 grips the body side outer corresponding to the first work-piece 117, and the handling robot 107 grips the front pillar inner part corresponding to the second work-piece 119. Each of the robots 105 and 107 is provided with a plurality of (three in this case) robot hands 109 and 111, and the welding cables are buried in or attached to a base 131 of the robot hand in such a manner as to simultaneously perform the welding in the other robot hands 109 and 111 by supplying the electric power to the robot hands 109 and 111 disposed in the most bottom portion in FIG. 10 by means of the electric power supply robot 129.

In the embodiments shown in FIGS. 9 and 10, the respective robot hands 109 and 111 face each other in a state that the work-pieces 117 and 119 are gripped by the gripping portion (not shown), the combination units 113 and 115 are combined and connected to each other and thereafter the welding operation is performed by the welding electrodes 121 and 123 on the basis of the electric power supply operation by the electric power supply robot 129, so that the work-pieces 117 and 119 are welded and connected to each other.

Accordingly, in this embodiment, in addition to the effect of the embodiment shown in FIG. 8, since the welding cable for supplying the electric power is not drawn from the handling robots 105 and 107, the handling robots 105 and 107 can operate in a wide area and can smoothly operate.

Figure 13:
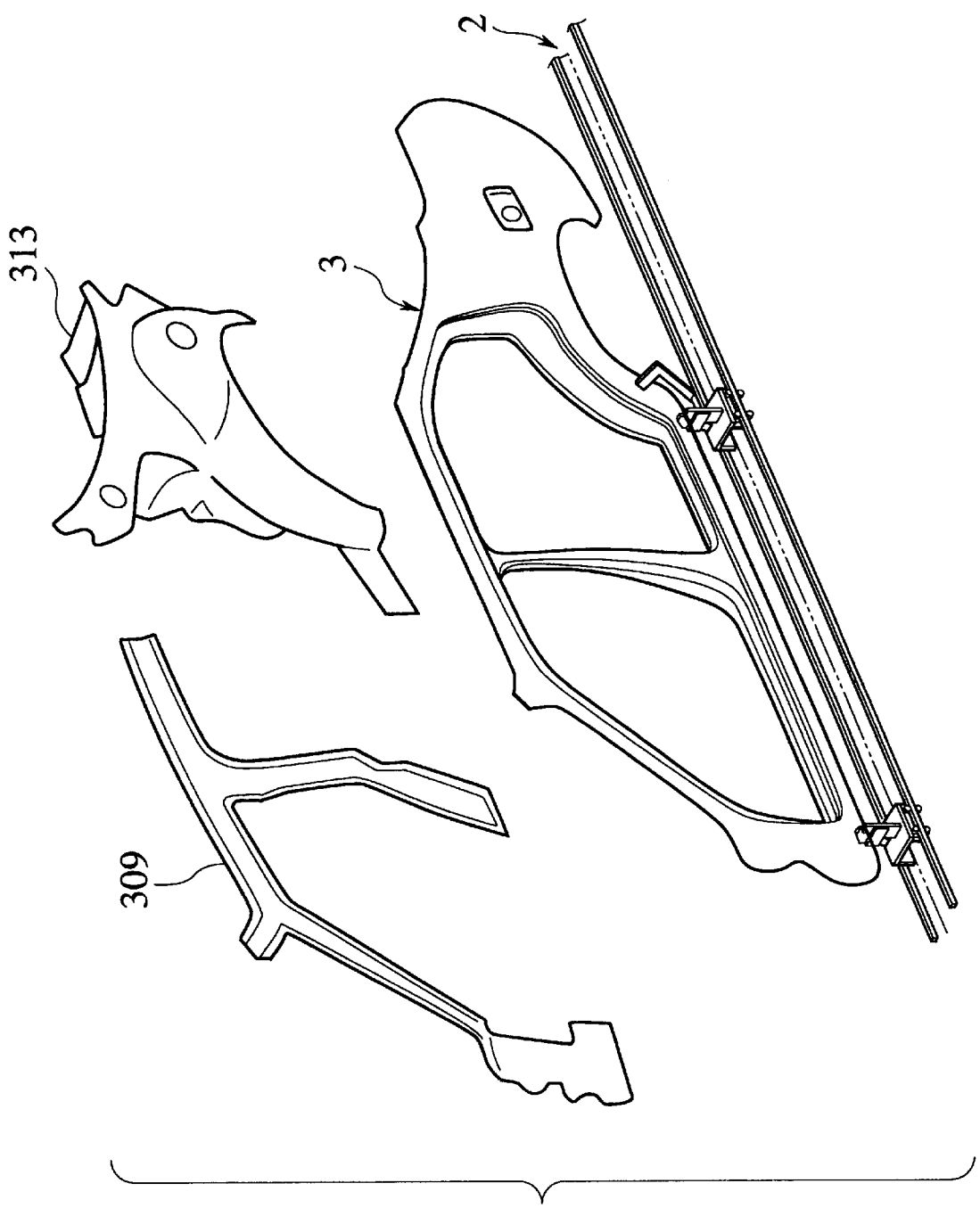
FIG. 13 is a perspective view showing a state in which an inner part is set to an outer assembled on the transfer line of the assembling apparatus of FIG. 11.

Next, another embodiment of the third stage III will be described below with reference to FIG. 11. In this embodiment, in place of the front pillar inner part 9, the center pillar inner part 11 and the rear pillar inner part 13 shown in FIG. 2, as shown in FIG. 13 an inner part comprising a front pillar inner part 309 and a wheel house rear pillar inner part 313 is assembled to the body side outer 3 which is additionally welded in the second stage 11 by a temporary welding. In this case, as shown in FIG. 14, in a state that the body side outer 3 is positioned from the side portion by a positioning jig 325 of a tetrahedron positioning apparatus 323 advancing to the transfer apparatus 2, a handling robot 327 provided in the side opposite to the tetrahedron positioning apparatus 323 sets the respective inner parts 309 and 313 and a welding robot 329 temporarily welds the inner parts 309 and 313.

Figure 14:
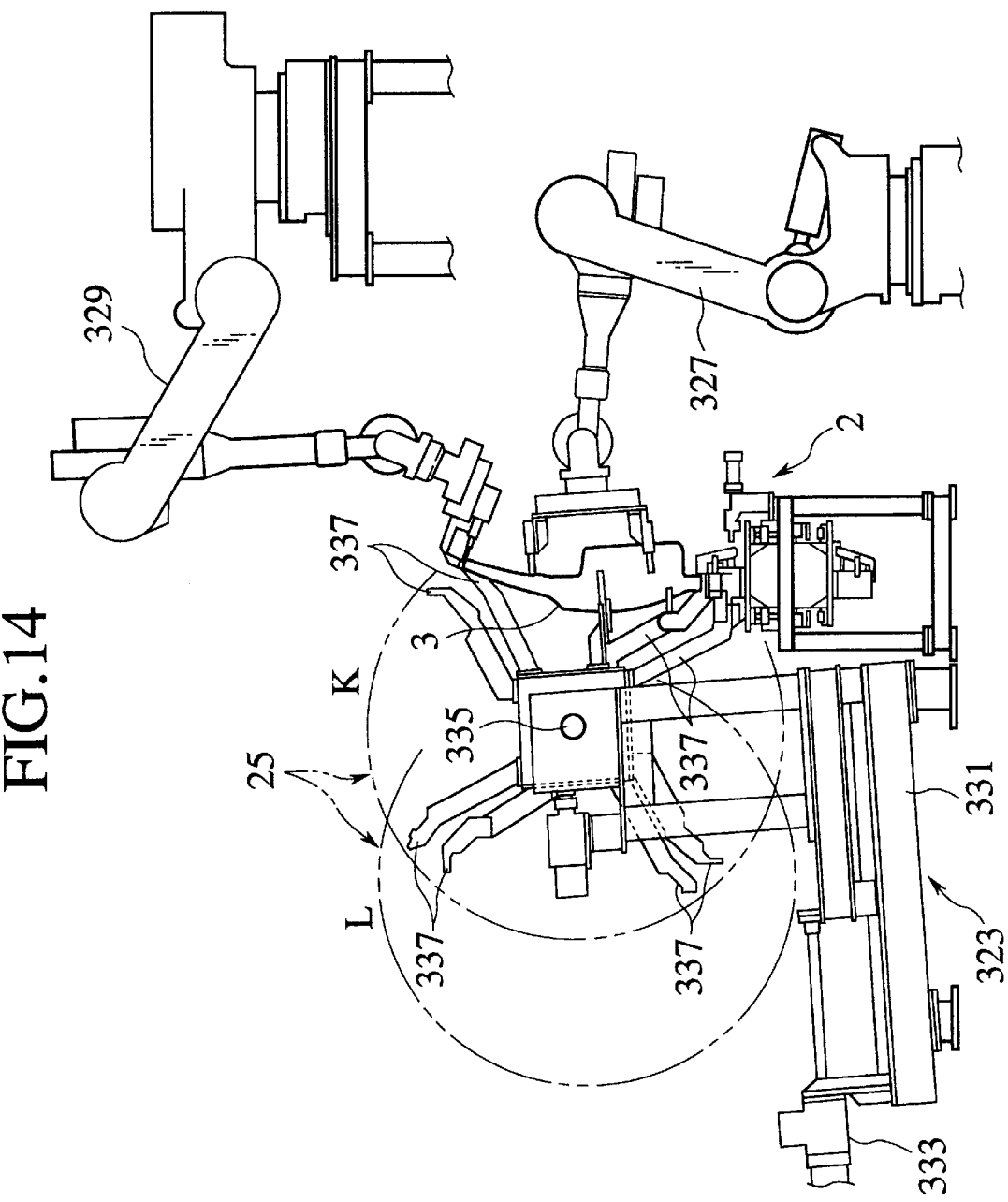
FIG. 14 is a side elevational view which shows a concrete structure of a third operation stage III in the operation stage shown in FIG. 2.

As shown in FIG. 14 which corresponds to a drawing as seen from the second stage II toward the transfer direction, the tetrahedron positioning apparatus 323 is disposed in the side of the transfer apparatus 2, and the positioning jig 325 can be slidably moved between the advanced position as shown by K in the drawing and the retracted position as shown by L in the drawing on a base table 331 by means of an oil hydraulic cylinder 333 and can be rotated around a supporting shaft 335. The positioning jig 325 mentioned above has a plurality of jig arms 337 projecting therefrom for positioning body side outers 3 having a different shape in a peripheral directionand for positioning the body side outer 3 using the front ends of the pair of vertical jig arms 337 at a predetermined rotational position.

Figure 11:
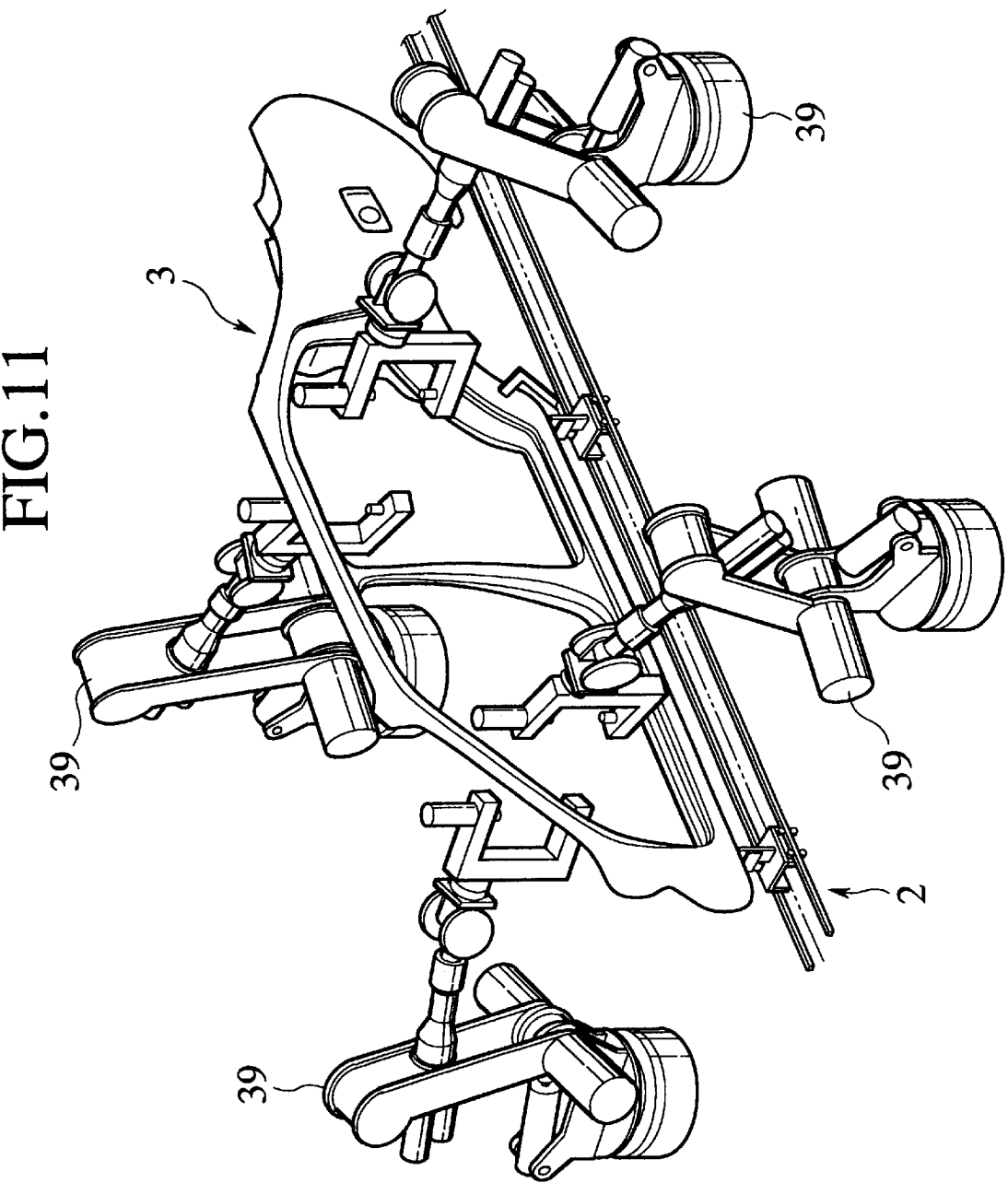
FIG. 11 is a perspective view which shows a part of an assembling apparatus for assembling a body side of an automotive vehicle in accordance with an embodiment of the present invention.
Figure 12:
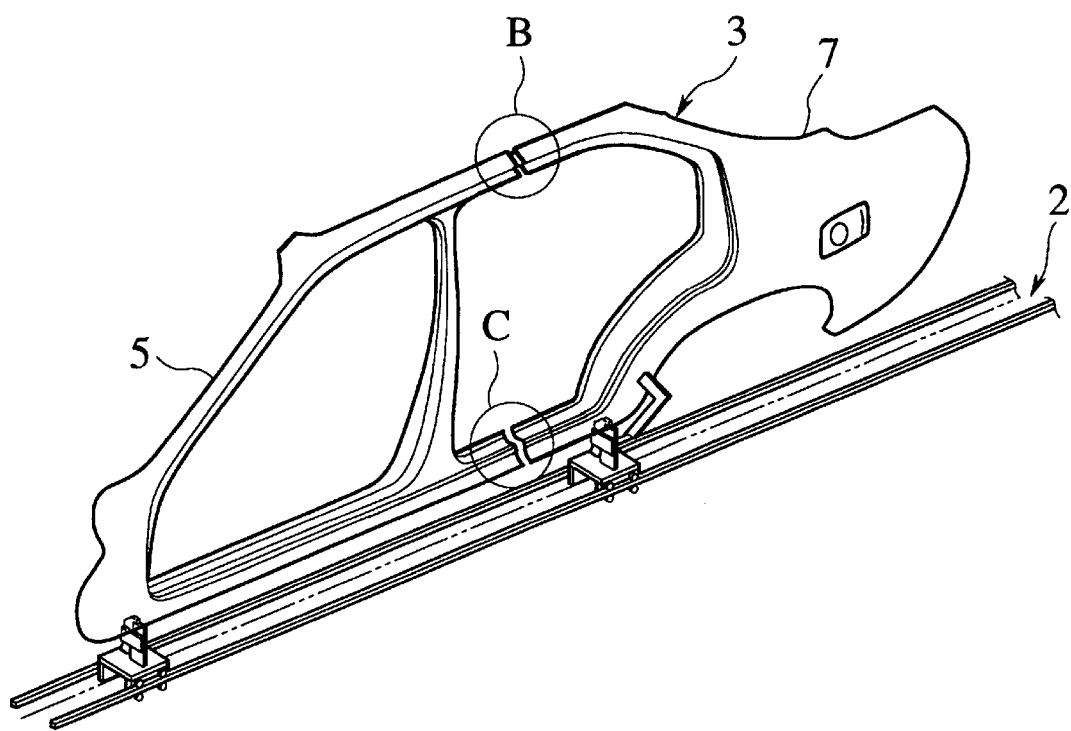
FIG. 12 is a perspective view showing a state in which a front and rear parts are set on a transfer line of an assembling apparatus of FIG. 11.

The fourth stage IV corresponds to the stage shown in FIG. 11, the additional welding between the inner parts 309 and 313, temporarily welded in the third stage III, and the body side outer 3 is performed by a plurality of welding robots 39 disposed on both sides of the transfer apparatus 2, thereby completing all of the welding operations and forming body side 1.

Figure 15:
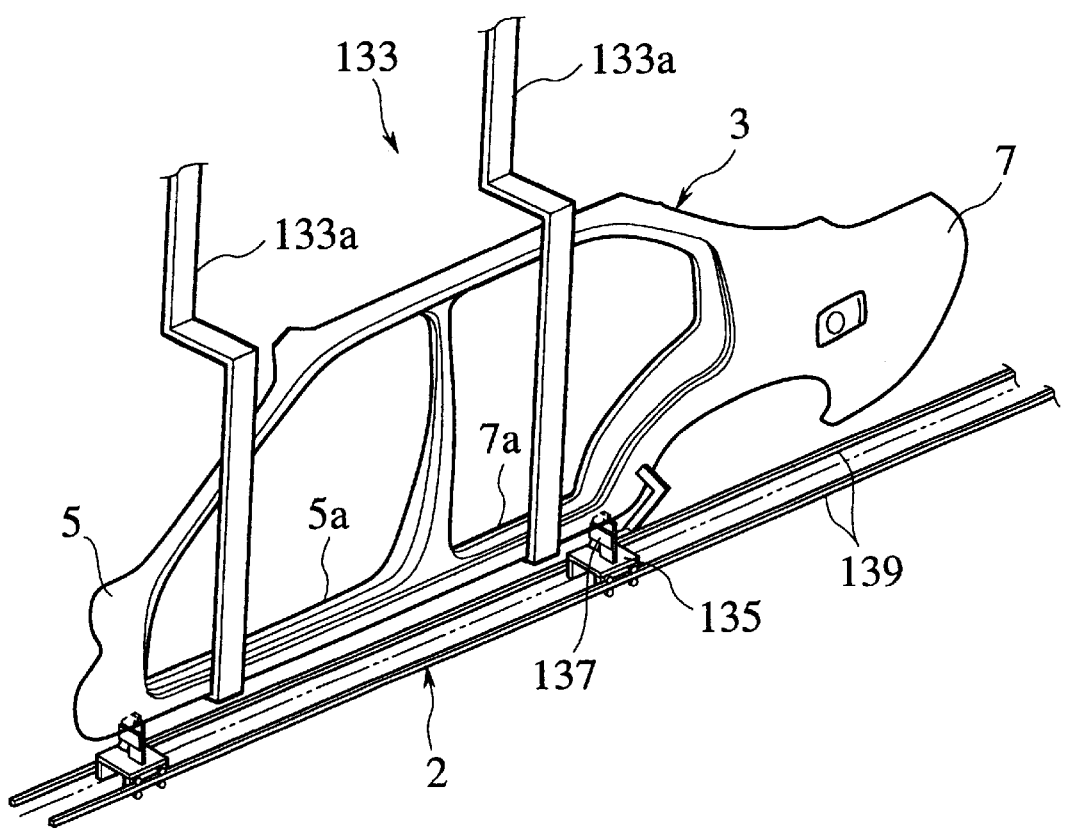
FIG. 15 is a perspective view which shows a state of carrying out the body side obtained by completion of the welding operation in the assembling apparatus shown in FIG. 2.

In the fifth stage V, the body side 1 obtained in the fourth stage IV is hung up by the lifter 133, and is transferred to the following stage. The lifter 133 is constituted by a drop lifter in which two supporting arms 133*a* are hung down from the overhead conveyor (not shown) so as to ascend and descend as shown in FIG. 15, and the body side 1 is hung up by the hook portion disposed in the lower end of the supporting arm 133*a* and is carried out.

The work-piece on the transfer apparatus 2 mentioned above is transferred with the lower ends of the side sills 5*a* and 7*a* in the respective lower portions of the front part 5 and the rear fender part 7 positioned and fixed by a clamp means 137 disposed on a moving body 135. The moving body 135 moves along a pair of guide rails 139 disposed to extend toward the transfer direction together with the clamp means 137.

Figure 16:
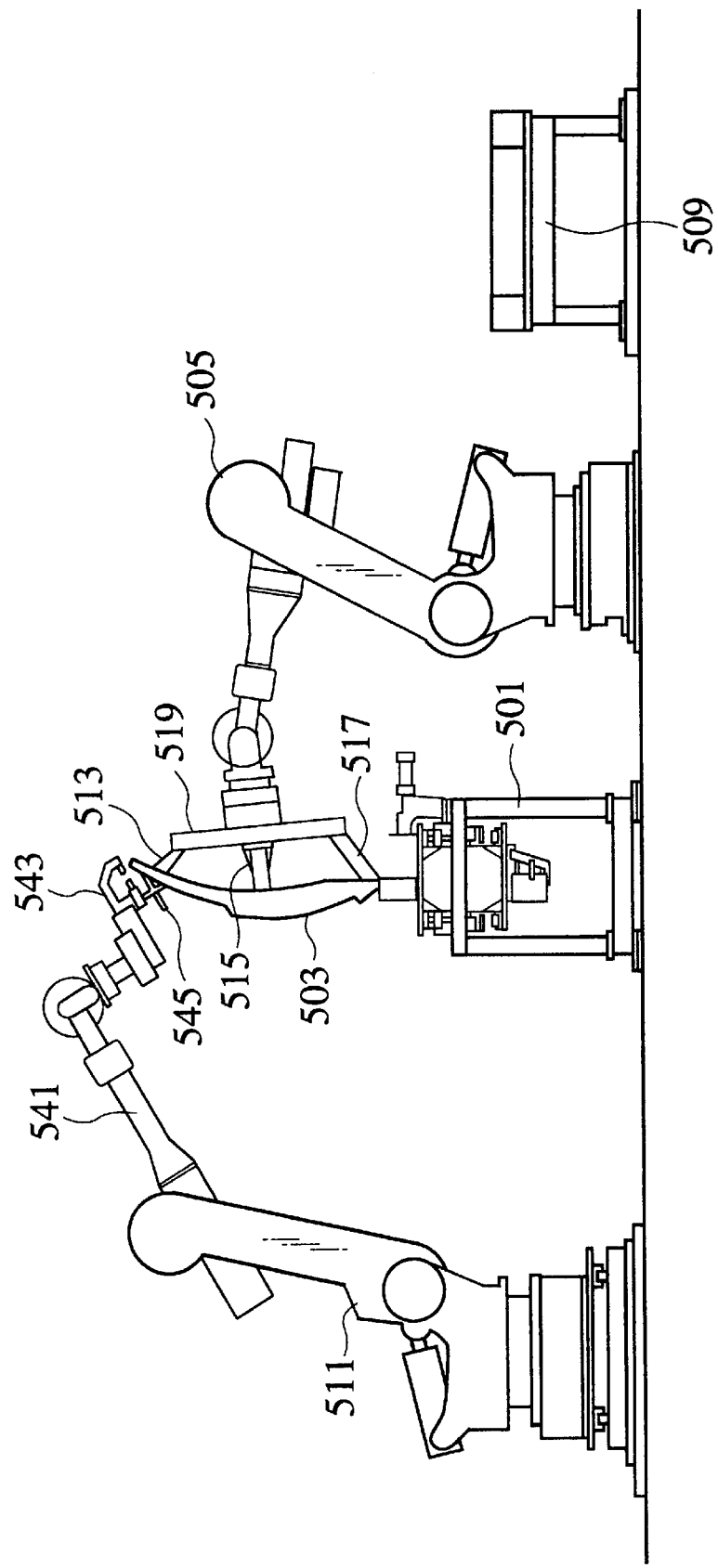
FIG. 16 is a side elevational view which shows a state of welding the work-piece by a handling robot in the assembling apparatus shown in FIG. 2.

FIG. 16 shows a concrete structure of the welding apparatus mentioned above, and corresponds to the drawing as seen from the left side to the front side of the transfer direction in FIG. 2. A handling robot 505 is provided with an upper end hand portion 513 for setting a sub part 7 in the upper side of a main part 503, a central end hand portion 515 for setting the sub part 507 in the central portion in the vertical direction of the main part 503, and a lower end hand portion 517 for setting the sub part 507 in the lower portion of the main part 503.

Figure 17:
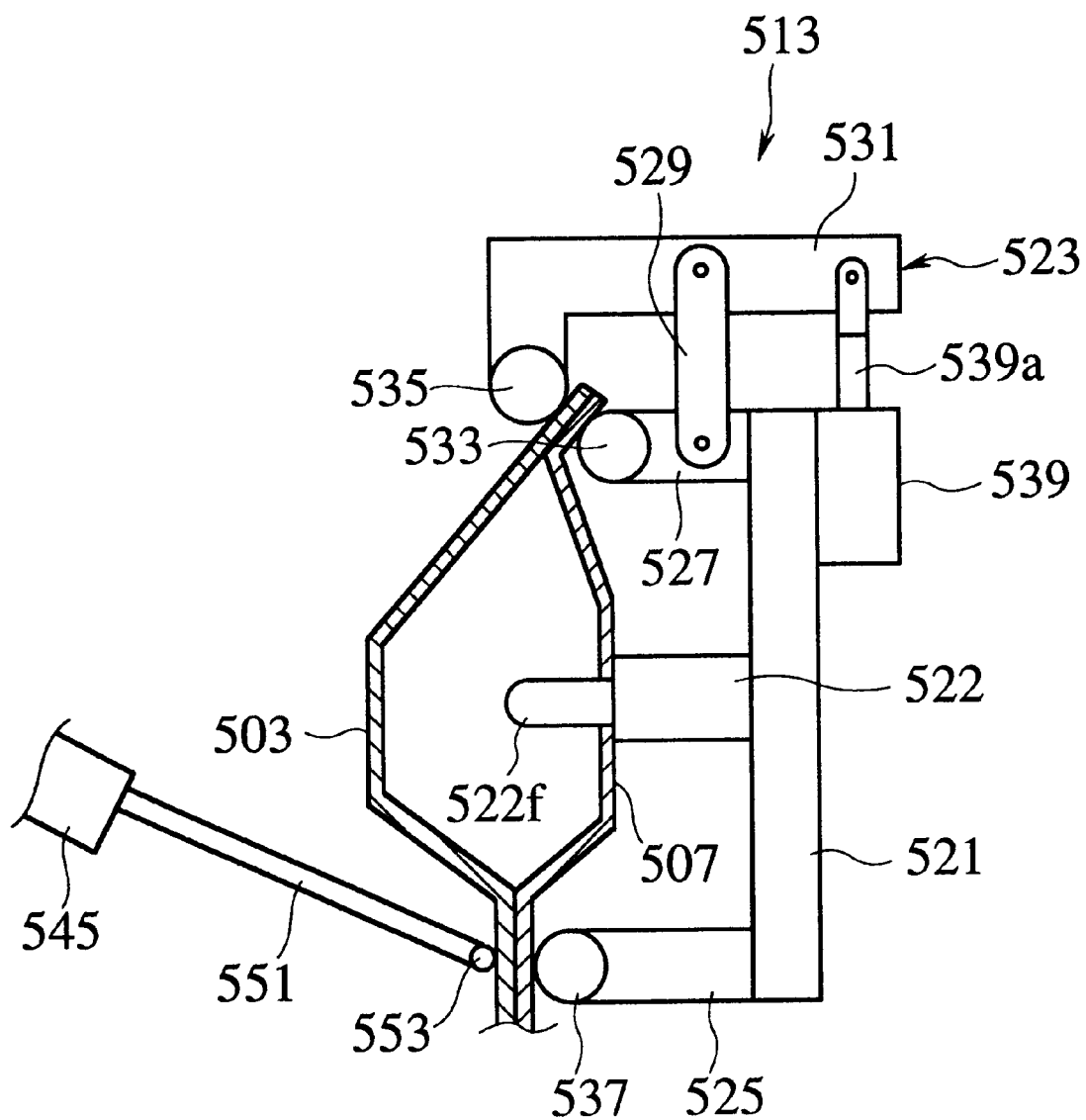
FIG. 17 is a view which shows details of a hand portion in the handling robot shown in FIG. 16.

FIG. 17 shows the details of the hand portion 513 disposed in the upper portion among the hand portions 513, 515 and 517, and the hand portion 513 is provided with a supporting bracket 521 fixed to an arm base 519 of the handling robot 505. A locating clamp 522 serving as a gripping portion for gripping the sub part 507 is provided in the central portion in the vertical direction of the supporting bracket 521, a holding portion 523 for holding the sub part 507 and the main part 503 therebetween is provided in the upper end portion of the supporting bracket 521, and a contact portion 525 for bringing into contact with the sub part 507 is provided in the lower end portion of the supporting bracket 521.

Figure 18:
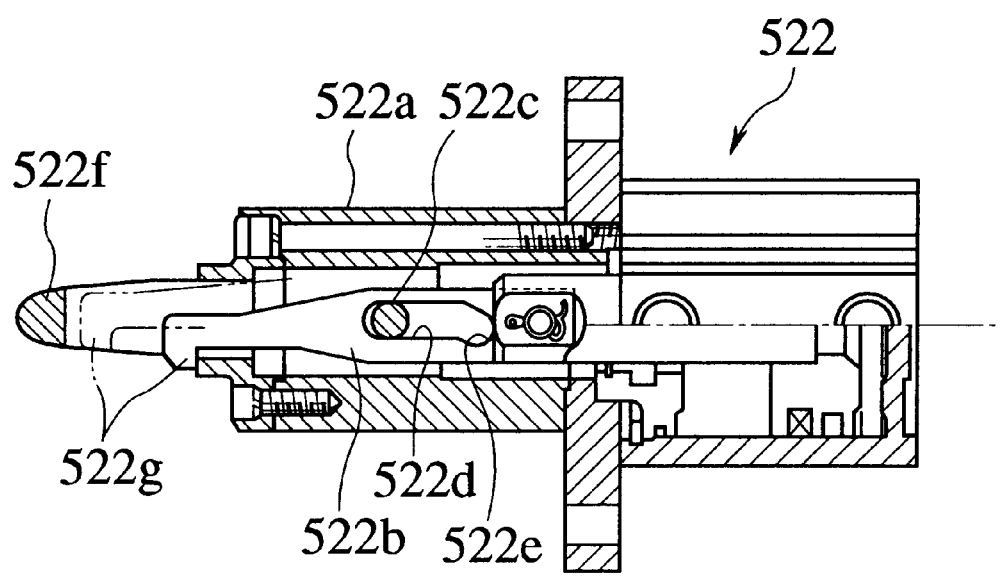
FIG. 18 is a view which shows details of a locating clamp shown in FIG. 17.

In the locating clamp 522, as shown in FIG. 18, a clamping hook 522b is housed within a body 522a in such a manner as to move in the lateral direction by the piston and cylinder shown in the drawing. This lateral motion is performed by inserting and fitting a supporting pin 522c provided on the body 522a into a long hole provided in the clamp hook 522b. The long hole 522d is provided with a bent portion 522e in the rear end corresponding to the right end in the drawing, and the clamp hook 522b moves forward and the supporting pin 522c inserts into the bent portion 522e so that the clamp hook 522b becomes a state shown by a two dot chain line.

The body 522a is provided with an insertion portion 522f to be inserted into an inserting hole formed on the sub part 7 in the front end thereof. When the insertion portion 522f is inserted into the inserting hole of the sub part 7, the clamp hook 522b moves toward the front end as shown in the two dot chain line and a hook portion 522g disposed in the front end is inserted into the insertion portion 522f. However, at a time of clamping the sub part 7 the clamp hook 522b is retracted backward and the hook portion 522g projects from the side portion of the insertion portion 522f, so that the sub part 7 can be clamped between the hook portion 522g and the body 522a.

In this case, the work-piece comprising the main part 503 and the sub part 507 have welding portions on both top and bottom sides, as depicted in FIG. 17, and from a central space portion therebetween when the two parts are connected An upper portion of the work-piece comprising parts 503, 507 near the upper welding portion is held by the holding portion 523 and a portion of the work-piece near the other welding portion disposed in the lower portion in FIG. 17 is supported by the contact portion 525 by bringing into contact with the sub part 507.

The holding portion 523 is provided with a fixing arm 527 the base end of which is fixed to the supporting bracket 521, and a movable arm 531 rotatable through a connecting link 529 with respect to the fixing arm 527. Spherical pressing portions 533, 535 and 537 are respectively provided in the front ends of the respective arms 527 and 531 and the contact portion 525, and these pressing portions 533, 535 and 537 are in contact with the work-piece.

An air cylinder 539 is attached to the portion opposite to the portion to which the fixing arm 527 of the supporting bracket 521 is mounted, and the front end of a rod 539a of the air cylinder 539 is fixed to the base end of the movable arm 531. Accordingly, the movable arm 531 is rotated around the connecting portion to the connecting link 529 by operating the air cylinder 539, and is displaced between the held position shown in FIG. 17 and the non-held position shown in FIG. 19.

With respect to the other hand portions 515 and 517 in the handling robot 505, the structure thereof may be made the same as that of the hand portion 513 shown in FIG. 17 in correspondence to the shape of the main part 503 and the sub part 507, or the connecting aspect of these both parts, or in contrast of this, may be made the different structure For example, the holding portion 523 may be provided in the lower portion and the contact portion 525 may be provided in the upper portion, respectively.

Figure 20:
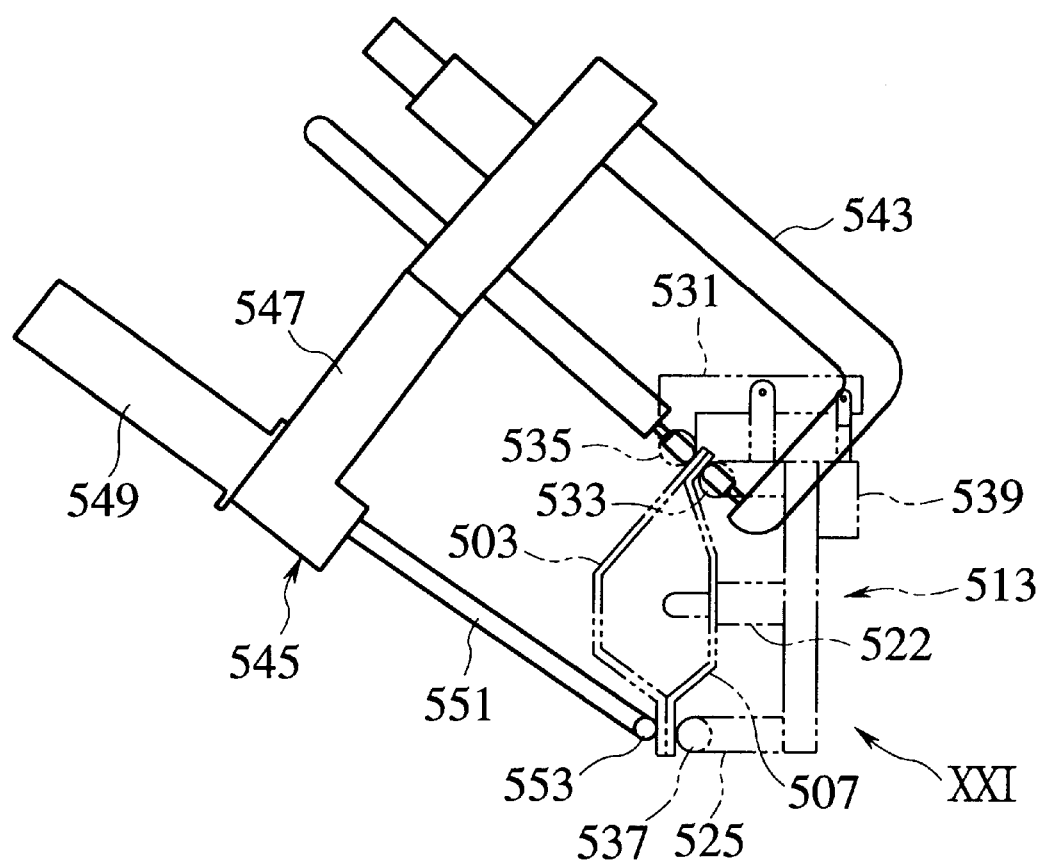
FIG. 20 is a perspective view which shows an operation of the welding operation by the welding robot shown in FIG. 16.

On the contrary, the welding robot 11 is provided with a welding gun 543 in the front end of an arm 541, as shown in FIG. 16, the welding gun 543 is provided with a pressing portion 545 for pressing the main part 503 as shown in FIG. 20 so as to hold the work-piece with respect to the contact portion 525 of the handling robot 505 shown in FIG. 17.

In the pressing portion 545, an air cylinder 549 is attached to a bracket 547 integrally projecting from the welding gun 543, a spherical pressing portion 553 is provided in the front end of a rod 551 of the air cylinder 549.

Figure 19:
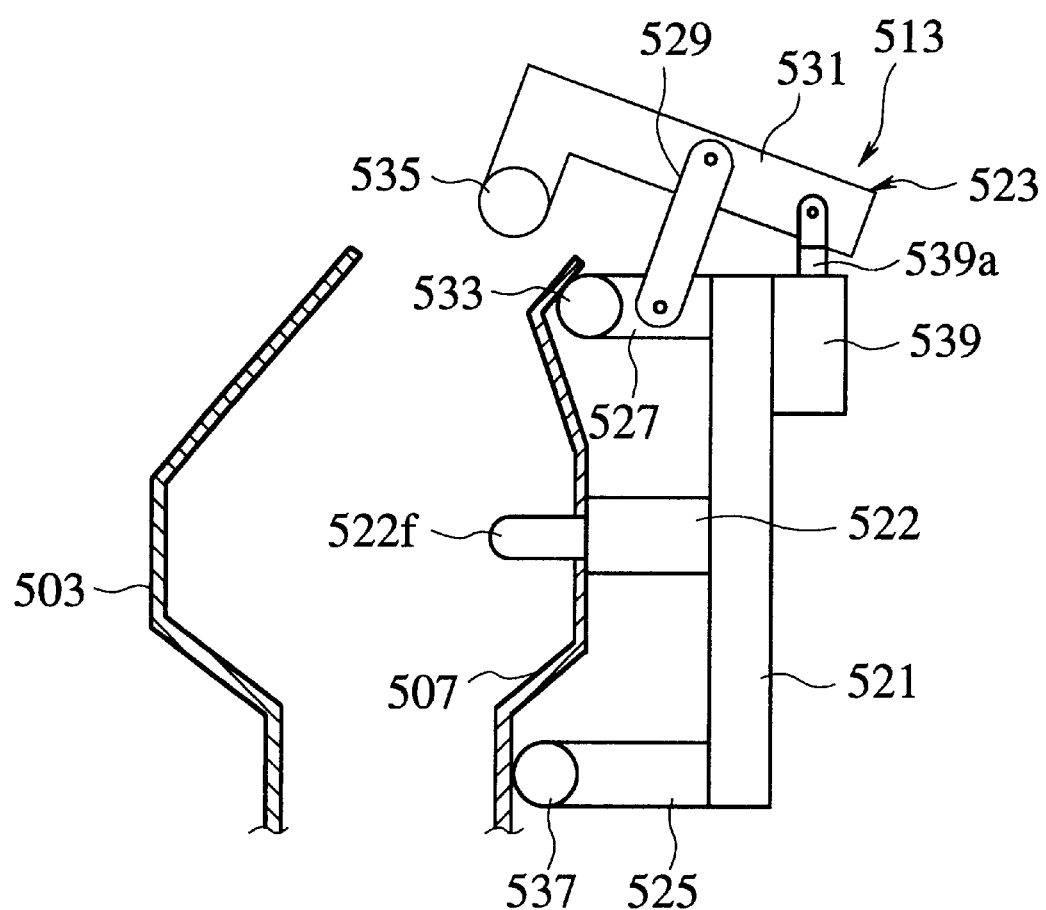
FIG. 19 is a perspective view which shows an operation of the hand portion in the handling robot shown in FIG. 16.

Next, an operation will be described below. When the main part 503 is transferred to the welding position shown in FIG. 2 by the transfer apparatus 501 and stopped, the handling robot 505 clamps the sub part 507 on the pallet 509 by means of the locating clamp 522 so as to put the sub part 507 close to the predetermined portion of the main part 503 as shown in FIG. 19. At this time, in the holding portion 523 of the handling robot 505, the front end of the movable arm 531 is apart from the fixing arm 527 so that both the arms 527 and 531 are released to each other and the pressing portion 533 disposed in the front end of the fixing arm 527 in the released state and the pressing portion 537 disposed in the front end of the contact portion 525 are in contact with the sub part 507.

The sub part 507 is further moved from the state shown in FIG. 19 so as to set and position the main part 503 to a predetermined portion. After positioning and setting, by operating the air cylinder 539, the movable arm 531 is rotated and displaced to assume the position depicted in FIG. 17. Thus, the work-piece is held and fixed by the pressing portion 535 disposed in the front end of the movable arm 531 and the pressing portion 533 disposed in the front end of the fixing arm 527. The holding portion by the handling robot 505 mentioned above with respect to the work-piece is set a portion near the welding portion by the welding robot 511.

Figure 21:
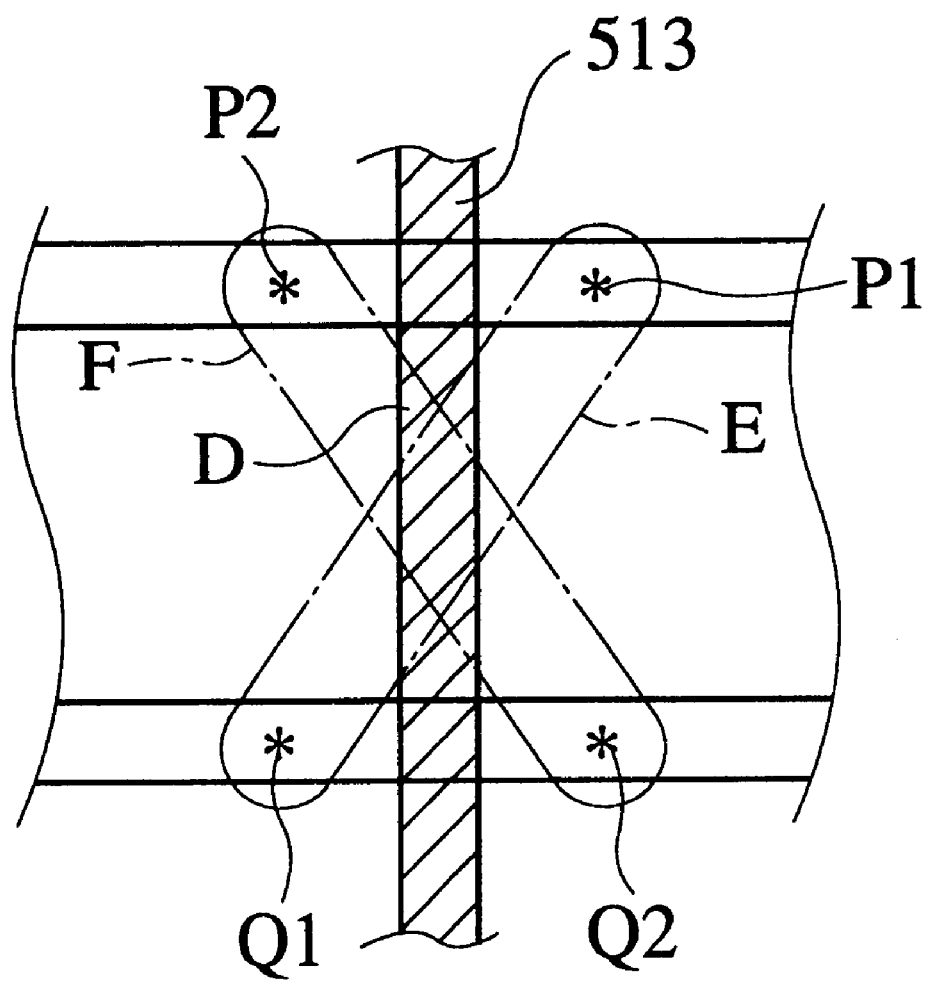
FIG. 21 is a perspective view which shows a position of the hand portion in the handling robot with respect to the work-piece and a position of a weld gun of the welding robot.

FIG. 21 is a perspective view which shows a position of the hand portion 513 in the handling robot 505 with respect to the work-piece as seen from an arrow XXI in FIG. 20 and a position of the weld gun 543 at a time of welding by the welding robot 511. The hand portion 513 of the handling robot 505 is positioned in an area D shown by an oblique line and the positioning and setting operation mentioned above is performed in this position. On the contrary, the welding gun 543 of the welding robot 511 is positioned in an area E shown by a one dot chain line which is oblique to the area D, and a point P1 within the area E indicates & welding position and a point Q1 indicates a pressing position by the pressing portion 545.

At a time of welding at the point P1 by means of the welding gun 543, the air cylinder 549 of the pressing portion is operated so as to extend the rod 551, so that the pressing portion 553 disposed in the front end thereof holds and fixes the work-piece at the point Q1 with respect to the pressing portion 537 of the fixing arm 535 in the handling robot 505. Accordingly, separation of the work-piece in the lower portion in FIG. 17 where the work-piece components 503 and 507 is not independently held and fixed by the handling robot 505 at a time of welding is prevented so that an accurate welding can be performed.

After the welding operation with respect to the point P1 in the area E by means of the welding gun 543 is completed, the pressurizing operation with respect to the work-piece by means of the welding gun is removed, and the pressing operation with respect to the main part 503 by means of the pressing portion 553 is removed by retreating the rod 551. In this state, the welding gun 543 is displaced to a position in an area F shown by a two-dot chain line shown in FIG.

15, and at this point, in the same manner as that mentioned above, the welding operation is performed at the point P2 by means of the welding gun 543 with pressing at the point Q2 by means of the pressing portion 545.

The welding operation with respect to the welding portion disposed in the lower portion in FIG. 17, that is, the points Q1 and Q2 in FIG. 21 is performed by the welding gun 543 in a state that the rod 551 of the air cylinder 549 in the pressing portion 545 is retracted.

As mentioned above, in accordance with the welding method for the parts of the vehicle body, since the welding operation is performed by the welding robot 511 in a state of positioning and setting the sub part 507 gripped by the handling robot 505 with respect to the main part 503, no jig for positioning the main part 503 on the transfer apparatus 501 is required, so that the sub part 507 can be welded and connected to the main part 503 with a reduced cost. Further, the holding portion 523, the contact portion 525, the hand portion 513 with the locating clamp 522 of the handling robot 505 and the pressing portion 545 of the welding robot 511 can be applied to the change of the shape of the work-piece without modification even when the work-piece shape is slightly changed by a model change of an automotive vehicle, so that the manufacturing cost can be reduced.

Figure 23:
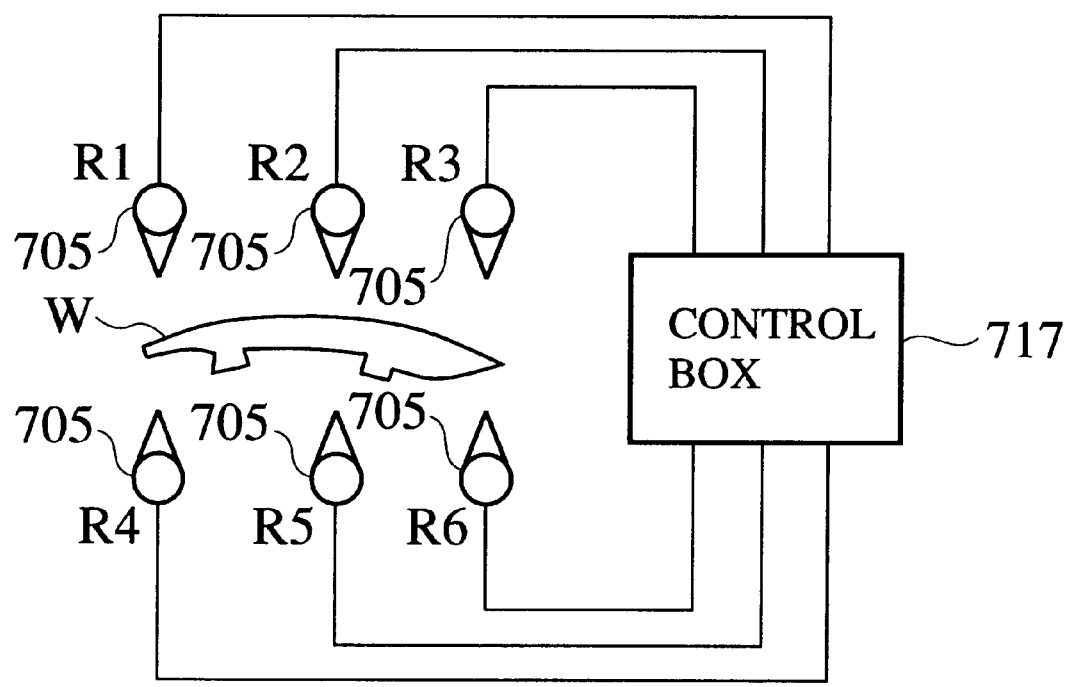
FIG. 23 is a schematic view which shows a simplified total structure of a welding position adjusting apparatus of the assembling apparatus in accordance with the present invention.

As shown in FIG. 23, a vibration of the work-piece W in the welding position is stopped and the position of the work-piece W is measured by using a welding robot 705. Vibration is prevented by using two welding robots 705, and the position measurement is performed by using six welding robots 705 including the two robots used for the vibration stop operation. Each of the welding robots 705 is provided with a welding gun 743 of a servo gun type, and the welding gun 743 is provided with a pair of electrode tips 713 and 715 which can be moved independently.

Figure 22:
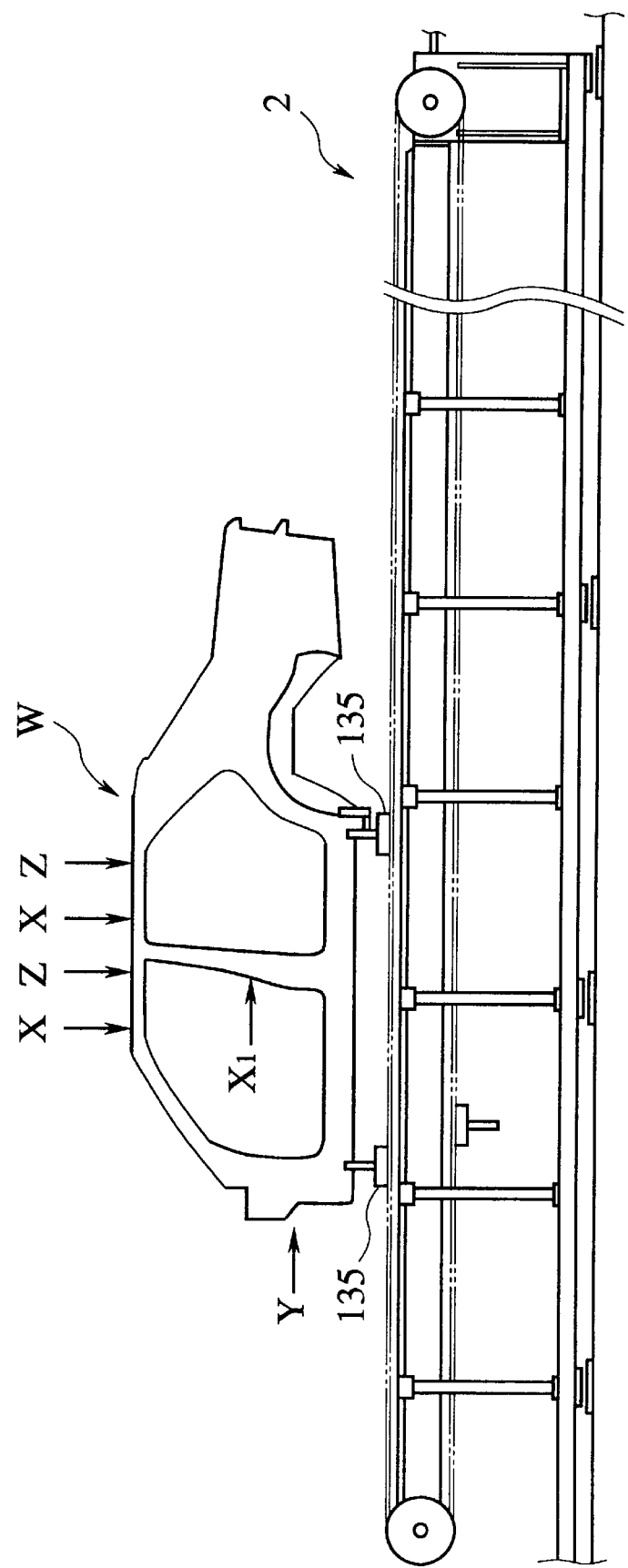
FIG. 22 is a plan view which shows the work-piece set on the transfer apparatus.

FIG. 22 is a plan view which shows the work-piece W set on the transfer conveyor 2, and the vibration stop position with respect to the work-piece W by the two welding robots 705 comprises six points including two points shown by X in the roof rail portion. On the contrary, the measurement position of the work-piece W comprises two points shown X mentioned above, two points shown by Z in the roof rail portion, one point shown by Y in the lower portion of the front pillar, and one point shown in X1 in the center pillar.

The measurement in the Y point is performed with respect to the position of the work-piece W in the transfer direction, the measurement in the X and X1 points is performed with respect to the position in the lateral direction perpendicular to the transfer direction, and the measurement in the Z point is performed with respect to the position in the vertical direction perpendicular to the plane including these respective directions. Accordingly, the three-dimensional coordinates with respect to the work-piece W can be measured.

FIG. 23 shows a connecting state between the six welding robots 705 disposed in the side portion of the work-piece W and a control box 717 for controlling the welding robots 705 in order to perform the vibration stop and the position measurement with respect to the work-piece W in a simplified manner. In this case, the welding robots 705 in correspondence to R1, R2 and R3 perform the measurement operation at X and X1 in FIG. 22, that is, measure the position of the work-piece W in the transfer direction Welding robot 705 in correspondence to R4 performs the measurement operation in the Y in FIG. 22, measuring the position in the lateral direction perpendicular to the transfer direction Further, the welding robots 705 in correspondence to R5 and R6 perform the measurement operation in the Z in FIG. 22, that is, measure the position in the vertical direction. Accordingly, six coordinates are calculated by adding all of the values in the transfer direction, the lateral direction and the vertical direction, so that the position measurement is performed.

Figure 24:
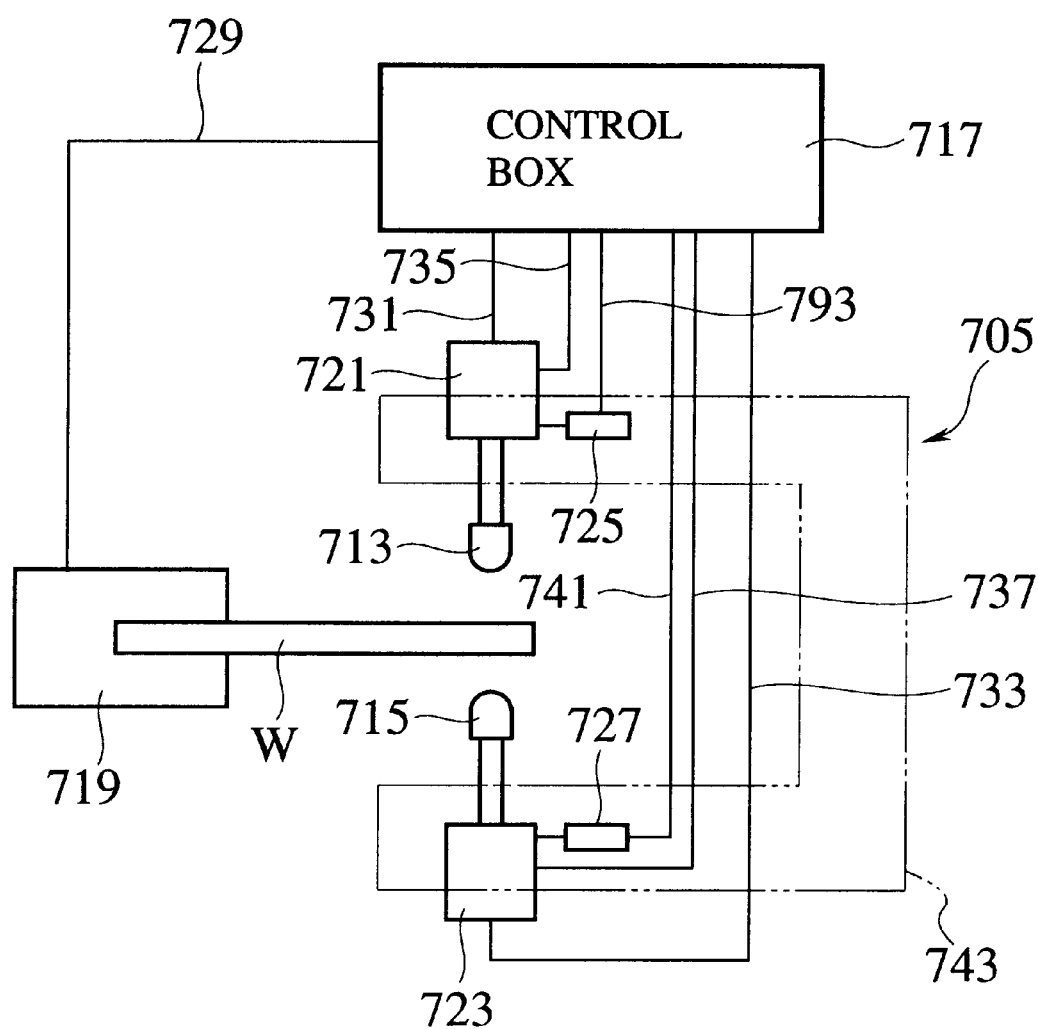
FIG. 24 is a block diagram of the welding position adjusting apparatus of the assembling apparatus in accordance with the present invention.

Next, a structure in which the welding robot 705 automatically grips and detects the work-piece W and the welding operation is performed by the detection will be described below with respect to FIG. 24. In the drawing, a servo mechanism 721 provided in the welding robot 705 brings the electrode tips 713 close to or apart from the work-piece W. When the electrode tips 713 are brought close to the work-piece W and brought into contact with the work-piece W, a detecting member 725 detects a difference of a load with respect to the servo mechanism 721 and sends a signal to the control box 717 through a circuit 739.

On the other hand, a servo mechanism 723 provided in the welding robot 705 brings the electrode tips 715 close to or apart from the work-piece W. The electrode tips 715 are brought close to the work-piece W and brought into contact with the work-piece W, a detecting member 727 detects a difference of a load with respect to the servo mechanism 723 and sends a signal to the control box 717 through a circuit 741.

In the above structure, when the electrode tips 713 and 715 disposed in the upper and lower portions of the welding robot 705 detects that the work-piece W is gripped, the work-piece W is welded by the electrode tips 713 and 715 on the basis of the commands by the control box 717.

In the above structure, the servo mechanisms 723 and 725 are respectively provided in both the electrode tips 713 and 715, however, the structure is not limited to the above structure. The approaching operation of the electrode tips 715 to the work-piece W is performed by using a servo mechanism for driving the robot hand of the welding robot 705.

Figure 25:
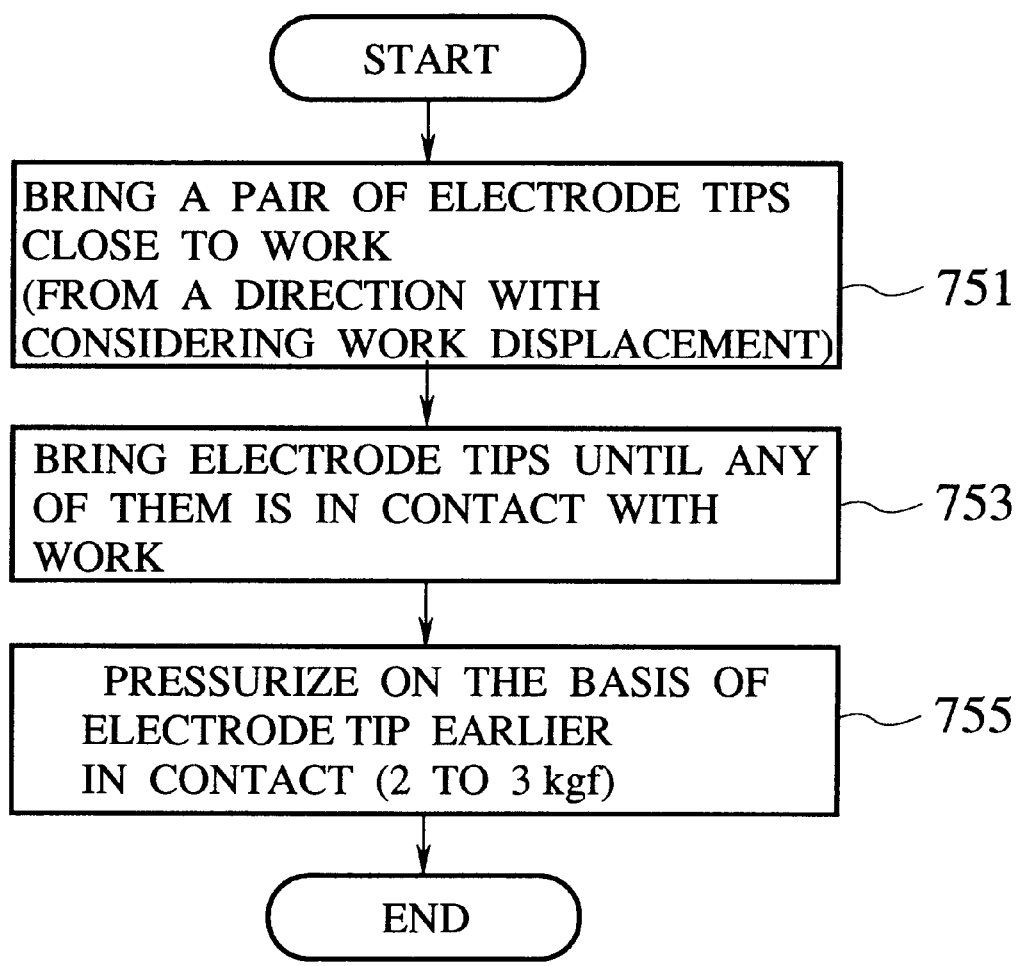
FIG. 25 is a flow chart which shows an operation for stopping a vibration of the work-piece in the welding position adjusting apparatus of the assembling apparatus in accordance with the present invention.
Figure 27:
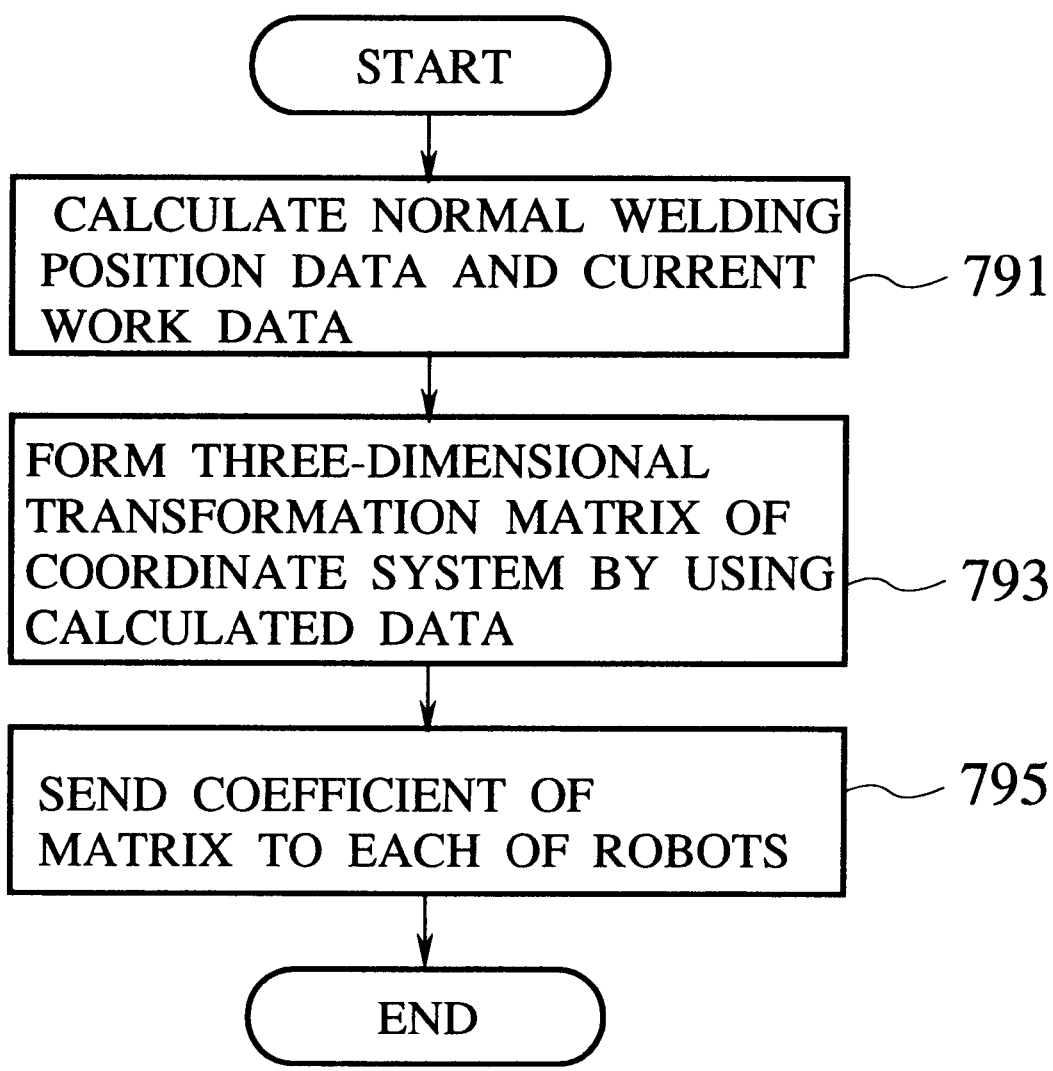
FIG. 27 is a flow chart which shows an adjusting operation of the welding position in the welding position adjusting apparatus of the assembling apparatus in accordance with the present invention.
Figure 28:
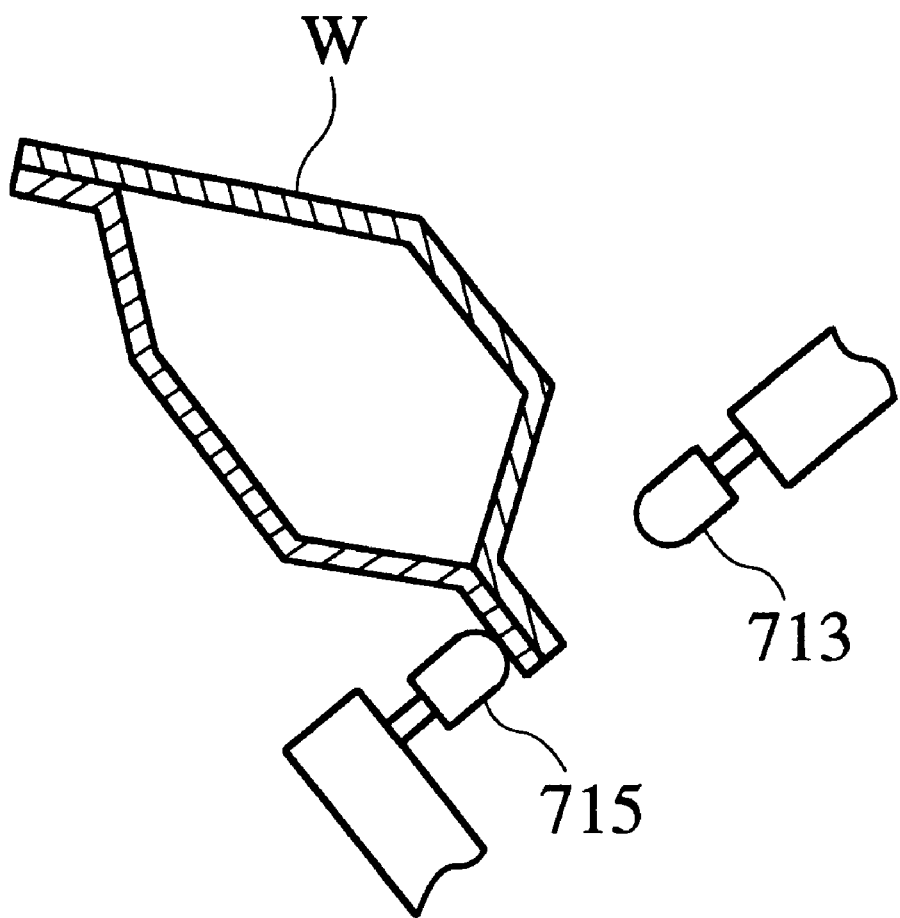
FIG. 28 is a schematic view which shows an approaching operation of a weld gun with respect to the work-piece.

FIGS. 25 and 27 are flow charts which shows the spot welding method including the vibration stopping operation and the position measurement operation in a state that the work-piece W is transferred to a predetermined welding stage position. FIG. 25 relates to the vibration stopping operation. At first, the pair of electrode tips 713 and 715 of the two welding robots 705 are brought close to the welding portion of the work-piece W to each other, as shown in FIG. 28 (a step 751). Since the direction of the displacement of the work-piece W is recognized by an experiment at a certain level, the approaching at this time is performed from the direction obtained by taking the displacement direction into consideration.

The approaching of the electrode tips 713 and 715 mentioned above is performed until any one of the tips is brought into contact with the work-piece W (a step 753). When any one of the electrode tips 713 and 715 is brought into contact with the work-piece W, the contact tip is made the reference and the other tip is brought close to, and the tips pressurizes the work-piece W by the load of 2 to 3 kgf so as to hold and fix the work-piece W (a step 755), so that the vibration of the work-piece W generated by the transfer operation is stopped.

Figure 26:
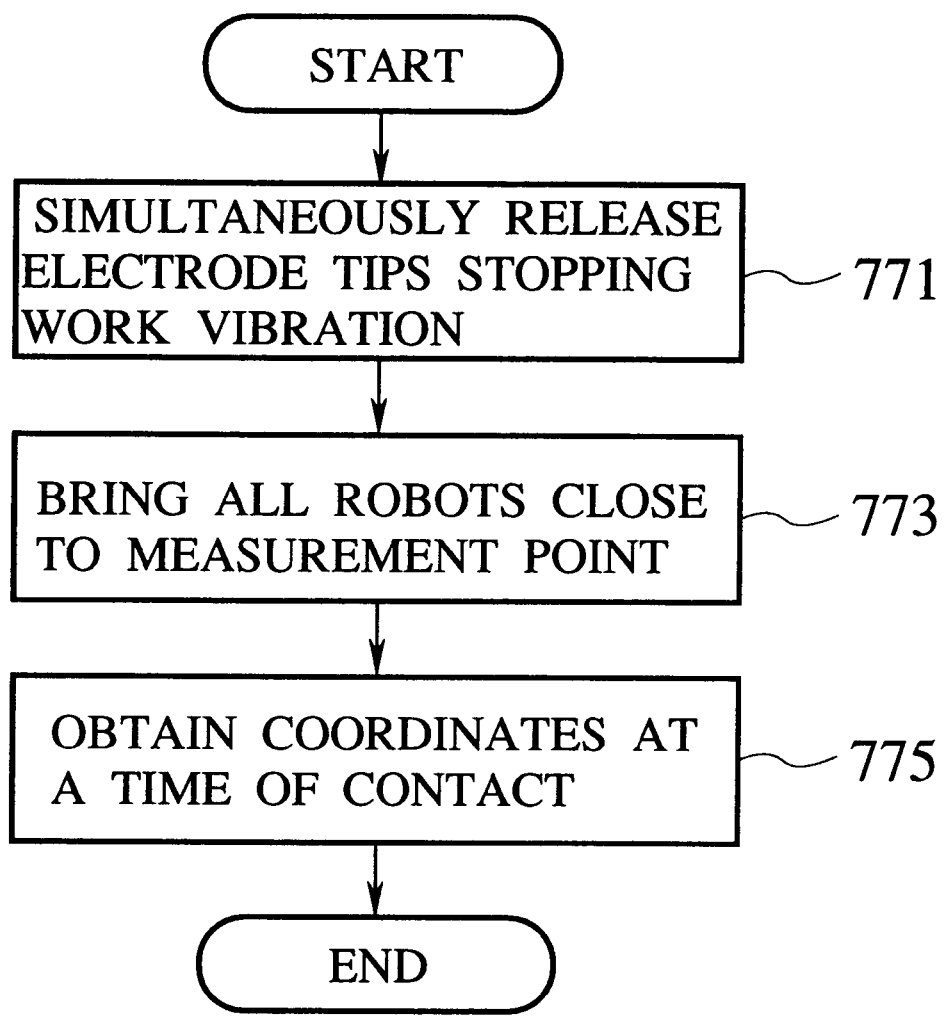
FIG. 26 is a flow chart which shows an operation for measuring a position of the work-piece in the welding position adjusting apparatus of the assembling apparatus in accordance with the present invention.

FIG. 26 relates to the position measurement operation of the work-piece W. The electrode tips 713 and 715 of the two welding robots 705 after stopping any vibration are simultaneously released so as to be brought apart from the work-piece W (a step 771), and the pair of electrode tips 713 and 715 of all the six welding robots 705 including the two released welding robots 705 are brought close to each other at a very small amount of speed in the respective positions X, X1, Y and Z shown in FIG. 22 (a step 773). At a time when one 713 (715) of the electrode tips 713 and 715 is in contact with the work-piece W due to the approaching, the very small amount of current passed from the contact electrode tip 713 (715) to the work-piece W so as to be conductive, thereby obtaining the work-piece position by all the six welding robots 705, that is, the three-dimensional coordinates in the six portion (a step 775).

FIG. 27 relates to the adjustment operation of the welding position after measuring the work-piece position. The six coordinates data obtained in the step 775 in FIG. 26 is compared with the predetermined set normal welding position data so as to be calculated (a step 791). Next, after forming a three-dimensional transformation matrix of the coordinate system by using the calculated data (a step 793), the coefficient of the formed matrix is sent to the respective welding robots 705 (a step 795). Accordingly, the respective welding robots 705 can perform the welding operation in the normal welding position. The method of forming the three-dimensional transformation matrix of the coordinate system by obtaining the six coordinates mentioned above has been already suggested by the applicant of the present invention as Japanese Patent Unexamined Publication No. 62-182610.

As mentioned above, since the vibration of the work-piece W transferred to the welding stage position is stopped by the relative pressurizing and holding operation between the pair of electrode tips 713 and 715 in the welding gun 707 and the following welding operation is performed after measuring the work-piece position by using the contact of the both electrode tips 713 and 715 with respect to the work-piece W and adjusting the welding position, no exclusive jig for positioning the work-piece W and no exclusive detector for detecting the work-piece position are required, so that the cost reduction can be achieved.

As stated above, a first aspect of the present invention provides an assembling apparatus assembling a body side of an automotive-vehicle, comprising: a moving body provided in a transfer line; a clamp member provided on the moving body for fixing and positioning a body side outer in an upright position in such a manner that a roof rail end of the body side outer is an upper portion and the side sill end of the body side outer is a lower portion; and a welding robot disposed in a side of the transfer line, the welding robot assembling the body side by welding the body side outer positioned by the clamp member.

In accordance with the assembling apparatus for assembling the body side of the automotive vehicle, since the lower end of the side sill can be made the same shape between different kinds of cars, the lower end of the side sill can be fixed in an upright position, so that it is unnecessary to provide an exclusive jig for each of the kinds of cars for fixing and holding the body side outer. Accordingly, the fixing device for positioning and fixing the body side outer can be easily simplified and used for various kinds of cars. Further, since the plurality of welding robots perform a welding operation with respect to the body side outer in an upright position from both sides thereof, interference between the robots can be avoided so that the operation efficiency can be improved. Further, since the body side outer is transferred and welded in an upright position corresponding to a direction in which a bending rigidity in a cross section of the work-piece becomes maximum with respect to a direction of operating the own weight of the body side outer, the body side outer is hard to be deformed in comparison with the state of horizontally laying down, so that the assembling accuracy can be improved and a space for operation can be reduced.

According to a second aspect of the present invention, the assembling apparatus assembling a body side of an automotive vehicle further comprises: a positioning jig disposed in the side of the transfer line advances into a front part and a rear fender part constructing the body side outer positioned on the transfer line so as to position the respective parts; and a work-piece setting robot disposed on a opposite side of the transfer line to the other side where the positioning jig disposed, the work-piece setting robot setting an inner part to the front part and the rear fender part.

In accordance with the assembling apparatus mentioned above, since the positioning jig disposed in the side of the transfer line advances into the front part and the rear fender part positioned on the transfer line so as to position from the side portion thereof, the setting operation of the inner parts can be performed at a more secure manner.

According to a third aspect of the present invention, there is provided an assembling method assembling a body side of an automotive vehicle, comprising the steps of: clamping the body side by a clamp member provided on the moving body for fixing and positioning a lower end of a side sill in an upright position in such a manner that a roof rail end of the body side outer is an upper portion and the side sill end of the body side outer is a lower portion; and transferring the body side in the standing position by a moving body provided with the clamp member and provided in a transfer line.

In accordance with the assembling method mentioned above, the same function and effect as those of the first aspect mentioned above can be obtained.

In accordance with a fourth aspect of the present invention, there is provided a work-piece positioning apparatus comprising a positioning mechanism provided near a welding position with respect to a plurality of work-pieces to be welded and connected to each other, and a plurality of handling robots each having a robot hand in which a positioning portion is positioned and fixed to the positioning mechanism in such a manner that the respective work-pieces are disposed at a normal welding and connecting position by moving the respective work-pieces in a state of being gripped by a grip portion.

In accordance with the work-piece positioning apparatus having the above structure, since the robot hands respectively gripping the plurality of work-pieces is positioned and fixed to the positioning mechanism, the rigidity of each of the robot hands is increased so as to improve the positional accuracy, and the plurality of work-pieces can be welded and connected to each other with a high accuracy.

In accordance with a fifth aspect of the present invention, there is provided a positioning method in which a plurality of work-pieces to be welded and connected to each other are set to a predetermined welding position in a state of being gripped by corresponding handling robots, and the handling robots are positioned and fixed to a positioning mechanism.

In accordance with the positioning method mentioned above, since the robot hands respectively gripping the plurality of work-pieces are positioned and fixed to the positioning mechanism, the rigidity of the robot hand is increased so as to improve the positional accuracy, so that the welding operation can be performed with a high accuracy.

In accordance with a sixth aspect of the present invention, there is provided a structure comprising a first handling robot provided with a robot hand for moving a first work-piece to a predetermined welding position in a state of gripping the first work-piece by a grip portion, a positioning mechanism disposed at the predetermined welding position and positioning and fixing the robot hand of the first handling robot in a state of moving the first work-piece to the predetermined welding position by means of a positioning portion of the robot hand, and a second handling robot provided with a robot hand in which a positioning portion is positioned and fixed to a positioned portion of the robot hand of the first handling robot positioned and fixed to the positioning mechanism by moving a second work-piece to be welded and connected to the first work-piece to the predetermined welding and connecting portion of the first work-piece in a state of being gripped by the gripping portion.

In accordance with the structure mentioned above, since the robot hand of the first handling robot is positioned and fixed to the positioning mechanism in a state of gripping the first work-piece, and the robot hand of the second handling robot gripping the second work-piece is positioned to the above robot hand, the rigidity of the respective robot hands is increased so as to improve the positional accuracy, so that the welding operation can be performed with a high accuracy.

In accordance with a seventh aspect of the present invention, there is provided a structure having first and second handling robots respectively provided with robot hands for gripping first and second work-pieces to be welded and connected to each other by means of a grip portion, in which each of the robot hands of the handling robots is provided with a positioning portion for positioning and fixing the first and second work-pieces to each other in a state of confronting the work-pieces to each other while gripping the first and second work-pieces, and a welding electrode for welding and connecting the first and second work-pieces to each other in a state of positioning and fixing the work-pieces by means of the positioning portion.

In accordance with the structure mentioned above, since the robot hands for gripping the first and second work-pieces are positioned and fixed to each other by means of the positioning portion, the rigidity of the respective robot hands is increased so as to improve the positional accuracy, so that the welding operation by means of the welding electrode can be performed with a high accuracy.

In accordance with a eighth aspect of the present invention, there is provided a structure in which an electric supply portion conducted to the welding electrode is provided in an outer portion of the robot hand in a projecting manner, and an electric supply robot for supplying an electric power for welding to the electric supply portion is provided.

In accordance with the structure mentioned above, since the electric power for welding is supplied to the electric supply portion of the welding electrode provided in the handling robot by means of the electric supply robot, no wiring from the outer portion is required in the handling robot.

In accordance with a ninth aspect of the present invention, there is provided a positioning method for positioning and fixing the robot hand of the first handling robot gripping the first work-piece and the robot hand of the second handling robot gripping the second work-piece to be welded and connected to the first work-piece in such a manner as to face to each other in a state of confronting the first and second work-pieces to each other.

In accordance with the positioning method mentioned above, since the robot hands gripping the first and second work-pieces are relatively positioned and fixed to each other, the rigidity of the respective robot hands is increased so as to improve the positional accuracy, so that the welding operation can be performed with a high accuracy.

In accordance with a tenth aspect of the present invention, there is provided a welding method for welding and connecting a main part and a sub part by means of the welding robot in a state of positioning and setting the sub part gripped by the handling robot to a predetermined position of the main part transferred to the predetermined welding position.

In accordance with the welding method for a part of an automotive vehicle mentioned above, since the sub part gripped by the handling robot is welded and connected to the main part in a state of being positioned and set thereto, no jig for positioning the main part on the transfer apparatus is required.

In accordance with a eleventh aspect of the present invention, there is provided a welding apparatus for a part of an automotive vehicle for welding and connecting a sub part to a main part transferred to a predetermined welding position by means of a transfer apparatus, comprising a handling robot for positioning and setting the sub part to a predetermined position of the main part in a state of gripping the sub part by a gripping portion, and a welding robot for welding and connecting the sub part and the main part positioned and set by the handling robot to each other.

In accordance with the structure mentioned above, since the sub part gripped by the handling robot is positioned and set to the main part on the transfer apparatus, and the welding operation can be performed in this state by means of the welding robot, no jig for positioning the main part on the transfer apparatus is required.

In accordance with a twelfth aspect of the present invention, there is provided a structure in which the main part and the sub part have a welding portion in both sides thereof with holding a central space portion therebetween in a state of connecting the both parts to each other, in which the hand portion of the handling robot for positioning and setting the sub part to the main part is provided with a holding portion for holding an adjacent portion of one of the welding portions with respect to the space portion, and a contact portion for bringing an adjacent portion of the other of the welding portions from the sub part, and in which the welding robot is provided with a welding gun for welding the one of the welding portions and a pressing portion for holding the main part and the sub part with respect to the contact portion close to the handling robot by pressing the other of the welding portions or the adjacent portion of the welding portion.

In accordance with the structure mentioned above, even in the case that the handling robot can not construct the holing portion in the adjacent portion of the other of the welding portions with a boundary of the space portion due to the shape of the main part and the sub part or the connecting type of both parts, the other of the welding portions can be held with respect to the contact portion close to the handling robot by pressing the pressing portion to the main part from the welding robot side, so that the welding operation can be stably performed.

In accordance with a thirteenth aspect of the present invention, there is provided a structure in which the pressing portion is integrally formed with the welding gun.

In accordance with the structure mentioned above the positioning and setting of the sub part with respect to the main part at a time of welding can be achieved by a compact structure.

In accordance with a fourteenth aspect of the present invention, there is provided a spot welding method comprising, a step of stopping a vibration of the work-piece by pressurizing and holding a predetermined portion of the work-piece transferred to the position of the welding stage by a pair of electrode tips in the welding gun provided in the welding robot, a step of measuring a position of the work-piece at a time of contact by the electrode tip by supplying a weak current in a state of bringing the electrode tip contact with the work-piece after removing the pressurizing and holding motion with respect to the work-piece by the both electrode tips, and a step of correcting a welding position against the work-piece on the basis of the measured position of the work-piece and a predetermined normal welding position against the work-piece by the welding gun so as to weld the work-piece.

In accordance with the spot welding method mentioned above, since the vibration of the work-piece generated by the transfer is stopped by pressurizing and holding by the pair of electrode tips to each other of the welding gun, and the following welding operation against the work-piece is performed after the work-piece position is measured by contacting the electrode tip with the work-piece and the welding position is corrected, no exclusive positioning jig for the work-piece and no exclusive detector for detecting the work-piece position are required, so that the cost reduction can be achieved.

In accordance with a fifteenth aspect of the present invention, there is provided a method in which the pressurizing and holding motion with respect to the work-piece by the pair of electrode tips is performed by that one of the electrode tips is brought into contact with the work-piece, the other of the electrode tips is brought into contact with the work-piece.

In accordance with the method mentioned above, the holding operation by the pair of electrode tips can be smoothly performed.

In accordance with a sixteenth aspect of the present invention, there is provided a method in which the measuring of the work-piece position is performed by calculating a three dimensional coordinate comprising a position of the work-piece transfer direction, a position in the lateral direction perpendicular to the transfer direction and a position in the vertical direction perpendicular to the plane including the above directions.

In accordance with the method mentioned above, the measurement of the work-piece position can be accurately performed by calculating the three-dimensional coordinate.

In accordance with a seventeenth aspect of the present invention, there is provided a method in which the measuring operations of a plurality of welding robots provided with a pair of electrode tips measured by calculating the three-dimensional coordinate are performed at the same time.

In accordance with the method mentioned above, the time for measurement can be shortened.

In accordance with a eighteenth aspect of the present invention, there is provided a method in which the pressurizing and holding operation by the electrode tips for stopping the vibration of the work-piece is performed in a plurality of portions of the work-piece.

In accordance with the method mentioned above, the vibration of the work-piece can be stopped in more secure manner.

While preferred embodiments of the present invention have been described using specific terms, such description is for illustrative purposes, and it is to be understood that changes and variations may be made without departing from the spirit or scope of the following claims.

What is claimed is:

1. An assembling method for assembling a body side of an automotive vehicle, comprising the steps of:

clamping a lower side sill end of a body side outer to a moving body by a clamp member provided on the moving body so that the clamp member fixes and positions the lower side sill end of the body side outer to the moving body in an upright position, wherein the body side outer is fixed in such a manner that a roof rail end of the body side outer is positioned substantially above the side sill end of the body side outer; and transferring the body side outer in the upright position by the moving body along a transfer line to a next welding stage of the transfer line.

2. The assembling method for assembling a body side of an automotive vehicle according to claim 1, further comprising the step of:

setting a plurality of work-pieces to be welded to a predetermined welding position of the body side outer by handling robots.

3. The assembling method for assembling a body side of an automotive vehicle according to claim 2, further comprising the step of:

welding the plurality of work-pieces to the predetermined welding position of the body side outer by means of a welding robot in a state where the plurality of work-pieces are held in position by the handling robots, to complete assembly of the body side.

* * * * *